(12) United States Patent
Fukaya et al.

(10) Patent No.: US 11,251,627 B2
(45) Date of Patent: Feb. 15, 2022

(54) CHARGE AND DISCHARGE CONTROL DEVICE FOR PREVENTING BATTERY DETERIORATION, BATTERY PACK, VEHICLE, AND CHARGE AND DISCHARGE CONTROL METHOD

(71) Applicant: KABUSHIKI KAISHA TOSHIBA, Minato-ku (JP)

(72) Inventors: Taro Fukaya, Tokyo (JP); Norio Takami, Yokohama (JP); Yasuhiro Harada, Isehara (JP); Takashi Kishi, Yokosuka (JP); Keigo Hoshina, Yokohama (JP); Kazuomi Yoshima, Yokohama (JP); Yasunobu Yamashita, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 132 days.

(21) Appl. No.: 16/783,265

(22) Filed: Feb. 6, 2020

(65) Prior Publication Data
US 2021/0075225 A1    Mar. 11, 2021

(30) Foreign Application Priority Data

Sep. 11, 2019 (JP) .............................. JP2019-165621

(51) Int. Cl.
*H01M 10/46* (2006.01)
*H02J 7/00* (2006.01)
*H01M 10/44* (2006.01)

(52) U.S. Cl.
CPC ......... *H02J 7/0013* (2013.01); *H01M 10/441* (2013.01); *H01M 10/46* (2013.01);
(Continued)

(58) Field of Classification Search
CPC ........ H02J 7/0047; H02J 7/0069; H02J 7/007; B60L 58/14; B60L 2240/547; H01M 10/441; H01M 10/482
(Continued)

(56) References Cited

U.S. PATENT DOCUMENTS

| | | | |
|---|---|---|---|
| 8,674,702 B2 * | 3/2014 | Kawai | H01M 10/48 320/132 |
| 2013/0030739 A1 * | 1/2013 | Takahashi | G01R 31/396 702/63 |

(Continued)

FOREIGN PATENT DOCUMENTS

| | | |
|---|---|---|
| EP | 3396396 | * 10/2018 |
| JP | 2011-175935 A | 9/2011 |

(Continued)

*Primary Examiner* — Edward Tso
(74) *Attorney, Agent, or Firm* — Oblon, McClelland, Maier & Neustadt, L.L.P.

(57) ABSTRACT

According to one embodiment, information related to a positive-electrode electric potential and a negative-electrode electric potential of each of one or more batteries is acquired, and whether deviation of the positive/negative-electrode electric potentials from a reference state is beyond a prescribed range is determined for each of one or more batteries. Further, in response to at least existence of a battery-to-be-restored that is a battery in which the determined deviation of positive/negative-electrode electric potentials from a reference state is beyond a prescribed range, a state of charge of the battery-to-be-restored is held in a restoration holding range for a prescribed time.

10 Claims, 8 Drawing Sheets

(52) U.S. Cl.
CPC ............ *H02J 7/007* (2013.01); *H02J 7/0047* (2013.01); *H01M 2220/20* (2013.01)

(58) Field of Classification Search
USPC ........ 320/128, 130, 131, 132, 149; 324/425, 324/246, 433; 702/63–65; 340/635, 1, 340/635.12, 636.19
See application file for complete search history.

(56) References Cited

U.S. PATENT DOCUMENTS

| | | |
|---|---|---|
| 2018/0076633 A1 | 3/2018 | Fujita et al. |
| 2018/0261893 A1 | 9/2018 | Fujita et al. |

FOREIGN PATENT DOCUMENTS

| | | |
|---|---|---|
| JP | 2018-46667 A | 3/2018 |
| JP | 2018-147827 A | 9/2018 |
| JP | 2018-156744 A | 10/2018 |

\* cited by examiner

CHARGE AND DISCHARGE CONTROL DEVICE FOR PREVENTING BATTERY DETERIORATION, BATTERY PACK, VEHICLE, AND CHARGE AND DISCHARGE CONTROL METHOD

CROSS-REFERENCE TO RELATED APPLICATIONS

This application is based upon and claims the benefit of priority from Japanese Patent Application No. 2019-165621, filed Sep. 11, 2019; the entire contents of which are incorporated herein by reference.

FIELD

Embodiments relate to a charge and discharge control device, a battery pack, a vehicle, and a charge and discharge control method.

BACKGROUND

Among batteries, a secondary battery such as a lithium-ion secondary battery is used as a high energy-density battery. In such a lithium-ion secondary battery, lithium ions move between a negative electrode and a positive electrode, thereby achieving charge and discharge. As a secondary battery, there has been devised a nonaqueous electrolyte battery in which a lithium-transition-metal composite oxide is used as a positive-electrode active material and a carbonaceous material, a titanium composite oxide, or the like is used as a negative-electrode active material, for example. In this case, as the transition metal in the lithium-transition-metal composite oxide, any of Co, Mn, Ni, and the like is used.

In such a battery as the above-described secondary battery, repetition of charge and discharge or long-time storage reduces a capacity. Causes for such reduction of a battery capacity include physical deterioration of an electrode group, as well as deviation of a positive-electrode electric potential and a negative-electrode electric potential from a reference state such as an initial state at a starting time of use. Thus, it has been required to properly determine reduction of a battery capacity caused by deviation of positive/negative-electrode electric potentials from a reference state. It has been further required to appropriately restore a capacity of a battery when the capacity is reduced due to deviation of positive/negative-electrode electric potentials from a reference state.

BRIEF DESCRIPTION OF THE DRAWINGS

FIG. 3 is a schematic view showing an example of a relation of each of a positive-electrode electric potential and a negative-electrode electric potential to a state of charge in the battery in FIG. 1 or the like.

FIG. 6 is a flowchart showing processes related to deviation of positive/negative-electrode electric potentials of a battery, performed by a controller of the charge and discharge control device in the system shown in FIG. 5 or the like.

FIG. 7 is a flowchart showing a first embodiment of a determination process of electric potential deviation from a reference state, performed by the controller of the charge and discharge device in the system shown in FIG. 5 or the like.

FIG. 8 is a flowchart showing a second embodiment of the determination process of electric potential deviation from a reference state, performed by the controller of the charge and discharge device in the system shown in FIG. 5 or the like.

FIG. 9 is a flowchart showing a first embodiment of a recovery process of electric potential deviation from a reference state, performed by the controller of the charge and discharge device in the system shown in FIG. 5 or the like.

FIG. 10 is a flowchart showing a second embodiment of the recovery process of electric potential deviation from a reference state, performed by the controller of the charge and discharge device in the system shown in FIG. 5 or the like.

DETAILED DESCRIPTION

Figure 1:
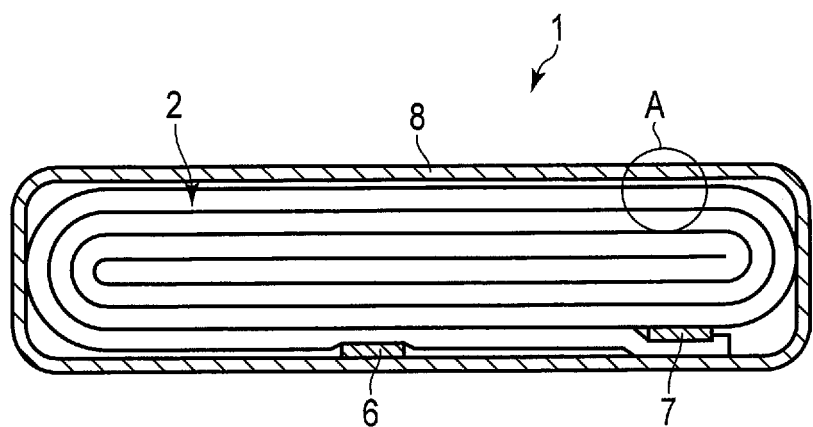
FIG. 1 is a schematic view showing an example of a battery of which charge and discharge are controlled by a charge and discharge control device according to embodiments.

According to one embodiment, a charge and discharge control device that controls charge and discharge of one or more batteries is provided. The charge and discharge control device includes a controller, and the controller acquires information related to a positive-electrode electric potential and a negative-electrode electric potential of each of the one or more batteries. Based on the acquired information, the controller determines whether deviation of the positive/negative-electrode electric potentials from a reference state is beyond a prescribed range, for each of one or more batteries. In response to at least existence of a battery-to-be-restored that is a battery in which the determined deviation of positive/negative-electrode electric potentials from a reference state is beyond a prescribed range, the controller holds a state of charge of the battery-to-be-restored in a restoration holding range for a prescribed time.

According to one embodiment, a battery pack which includes the above-described charge and discharge control device, and one or more batteries of which charge and discharge are controlled by the charge and discharge control device is provided.

According to one embodiment, a vehicle which includes the above-described charge and discharge control device, and one or more batteries of which charge and discharge are controlled by the charge and discharge control device is provided.

According to one embodiment, a charge and discharge control method of controlling charge and discharge of one or more batteries is provided. In the charge and discharge control method, information related to a positive-electrode electric potential and a negative-electrode electric potential of each of the one or more batteries is acquired. Further, in the charge and discharge control method, based on the acquired information, it is determined whether deviation of the positive/negative-electrode electric potentials from a reference state is beyond a prescribed range, for each of the one or more batteries. Then, in the charge and discharge control method, in response to at least existence of a battery-to-be-restored that is a battery in which the determined deviation of positive/negative-electrode electric potentials from a reference state is beyond a prescribed range, a state of charge of the battery-to-be-restored is held in a restoration holding range for a prescribed time.

Below, the embodiments will be described with reference to the drawings.

The following embodiments provide a charge and discharge control device that controls charge and discharge of one or more batteries. By this charge and discharge control device, charge and discharge of one or more batteries are controlled. The one or more batteries may be either a battery or a battery module formed of a plurality of batteries. Meanwhile, in the battery module of which charge and discharge are controlled by the charge and discharge control device, a plurality of batteries are electrically connected either in series or in parallel.

[Battery]

Below, an unit battery will be described. As a battery of which charge and discharge are controlled by the charge and discharge control device according to the present embodiments, a battery described below can be used. Similarly, as each of a plurality of batteries in a battery module of which charge and discharge are controlled by the charge and discharge control device according to the present embodiments, the battery described below can be used. The battery is a secondary battery such as a nonaqueous lithium-ion secondary battery, for example.

(Configuration of Battery)

Figure 2:
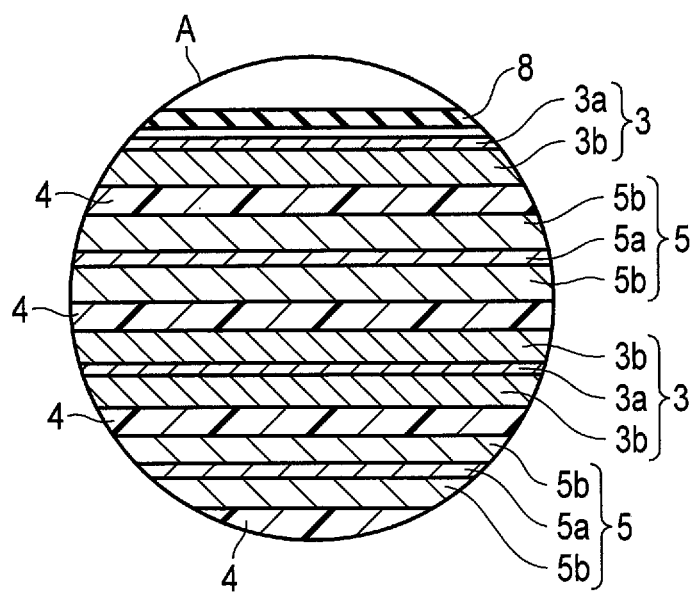
FIG. 2 is an enlarged sectional view schematically showing an area A in the battery in FIG. 1.

FIG. 1 shows an example of a battery 1, and FIG. 2 is an enlarged view of an area A in the battery (secondary battery) 1 in FIG. 1.

As shown in FIGS. 1 and 2, the battery 1 includes a bag-shaped container member 8, an electrode group 2, and an electrolyte (not shown). The electrode group 2 and the electrolyte are accommodated in the inside of the container member 8. The electrolyte (not shown) is held by the electrode group 2. The container member 8, in which the electrode group 2 and the electrolyte are being accommodated, is sealed, thereby forming the battery 1. In one example, the container member 8 is formed of a laminated film including two resin layers and a metallic layer interposed between the two resin layers.

The electrode group 2 includes a negative electrode 3, a separator 4, and a positive electrode 5. The separator 4 is interposed between the negative electrode 3 and the positive electrode 5 and electrically insulates the negative electrode 3 and the positive electrode 5 from each other. In the example shown in FIGS. 1 and 2, the electrode group 2 has a structure in which the positive electrode 5 and the negative electrode 3 with the separator 4 being interposed therebetween are spirally wound, and is formed into a flat shape, for example. In another example, the electrode group 2 has a structure in which the positive electrode 5, the separator 4, the negative electrode 3, and the separator 4 are stacked in the stated order.

The negative electrode 3 includes a negative-electrode current collector 3a and a negative-electrode mixture layer 3b. The negative-electrode mixture layer 3b is placed on both sides or one side of the negative-electrode current collector 3a. Similarly, the positive electrode 5 includes a positive-electrode current collector 5a and a positive-electrode mixture layer 5b. The positive-electrode mixture layer 5b is placed on both sides or one side of the positive-electrode current collector 5a.

The battery 1 further includes a negative-electrode terminal 6 and a positive-electrode terminal 7 as electrode terminals. The negative-electrode terminal 6 is connected with the negative-electrode current collector 3a and the positive-electrode terminal 7 is connected with the positive-electrode current collector 5a. In the example of FIGS. 1 and 2, the negative-electrode terminal 6 and the positive-electrode terminal 7 extend to the outside from an opening of the container member 8. The opening of the container member 8 is closed by heat-sealing of a thermosetting resin layer in an inner surface of the container member 8.

Examples of the above-described battery include a lithium-ion secondary battery. In a lithium-ion secondary battery, an electrode group performs charge and discharge through positive-electrode reaction and negative-electrode reaction in which lithium ions act as agents. Below, each of the negative electrode, the positive electrode, the electrolyte, the separator, the electrode terminals (the negative-electrode terminal and the positive-electrode terminal), the container member, and the like, that is, each of components of the battery, will be described in detail.

1) Negative Electrode

The negative electrode includes a negative electrode current collector and a negative electrode mixture layer disposed on the negative electrode current collector. The negative electrode mixture layer may be formed on one side or both sides of the negative electrode current collector. The negative electrode mixture layer contains a negative electrode active material, and can optionally contain an electro-conductive agent and a binder.

As the negative-electrode active material, a material that occludes and emits lithium ions is used, and a metal oxide or a metal fluoride can be used. In particular, a titanium-containing oxide is preferably selected as the negative-electrode active material. In the negative-electrode active material, a Li occlusion electric potential is preferably in a range from 1 V (vs. Li/Li$^+$) to 3 V (vs. Li/Li$^+$). Examples of the negative-electrode active material include a niobium oxide such as $Nb_2O_5$, a titanium oxide, a lithium titanium oxide, a niobium- and titanium-containing composite oxide, and a sodium-, niobium-, and titanium-containing composite oxide. In a case where a Li occlusion electric potential of the negative-electrode active material is lower than 1 V, side reaction between the negative-electrode active material and an electrolytic solution may probably occur. Meanwhile, in a case where a Li occlusion electric potential of the negative-electrode active material is higher than 3 V, a battery voltage is reduced.

Examples of the titanium oxide include a titanium oxide having a monoclinic structure, a titanium oxide having a rutile structure, a titanium oxide having an anatase structure, and a titanium oxide having an orthorhombic crystal structure. The titanium oxide having each crystal structure can be represented by $TiO_2$ as an uncharged composition and $Li_xTiO_2$ (x: $0 \leq x \leq 1$) as a charged composition. The uncharged structure of the titanium oxide having a monoclinic structure can be represented as $TiO_2(B)$. Details of the titanium oxide having an orthorhombic crystal structure will be described later.

Examples of the lithium-titanium-containing composite oxide include a lithium titanium oxide having a spinel structure (for example, the general formula: $Li_{4+x}Ti_5O_{12}$ ($-1 \leq x \leq 3$)), a lithium titanium oxide having a ramsdellite structure (for example, $Li_{2+x}Ti_3O_7$ ($-1 \leq x \leq 3$), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$). Examples of the lithium titanium oxide include a lithium titanium composite oxide in which a dopant is introduced into the above-described lithium titanium oxide having a spinel structure or a ramsdellite structure. In each of those lithium-titanium composite oxides, a volume change at the time of occluding and emitting lithium ions is small.

Examples of niobium- and titanium-containing composite oxide include a monoclinic niobium-titanium composite oxide such as $Nb_2TiO_7$, a monoclinic niobium- and titanium-containing composite oxide expressed by $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, M represents at least one element selected from the group consisting of Fe, V, Mo, and Ta), and the like.

Further, as the negative-electrode active material, a composite oxide having an orthorhombic structure expressed by a general formula of $Li_aM1_{1-b}M2_bTi_{6-c}M3_cO_{14+d}$ ($2 \leq a \leq 6$, $0 < b < 1$, $0 < c \leq 6$, $-0.5 \leq d \leq 0.5$, Ml includes at least one selected from the group consisting of Sr, Ba, Ca, and Mg, M2 includes at least one selected from the group consisting of Cs, K, and Na, and M3 includes at least one selected from the group consisting of Al, Fe, Zr, Sn, V, Nb, Ta, and Mo), and a composite oxide having an orthorhombic structure expressed by a general formula of $Li_{2+w}Na_{2-e}M\alpha_fTi_{6-g}M\beta_gO_{14+h}$ ($0 \leq w \leq 4$, $0 < e < 2$, $0 \leq f < 2$, $0 < g \leq 6$, $-0.5 \leq h \leq 0.5$, M$\alpha$ includes at least one selected from the group consisting of Cs and K, M$\beta$ includes at least one selected from the group consisting of Zr, Sn, V, Nb, Ta, Mo, W, Fe, Co, Mn, and Al), can be used. It is preferable that those composite oxides contain Nb. In this case, the composite oxide is a niobium-containing composite oxide having an orthorhombic structure.

In a niobium-containing composite oxide having an orthorhombic structure, a volume change at the time of occluding and emitting lithium ions is small. Further, an operating electric potential of a niobium-containing composite oxide having an orthorhombic structure is lower than that of spinel lithium titanate. Thus, a nonaqueous electrolyte secondary battery that is manufactured using an electrode containing a niobium-containing composite oxide having an orthorhombic structure, as a negative electrode, implements a higher battery voltage than that of a nonaqueous electrolyte secondary battery using spinel lithium titanate as a negative electrode. Moreover, with such a battery using a niobium-containing composite oxide having an orthorhombic structure as a negative electrode, a charge curve and a discharge curve along which electric potentials change with an appropriate gradient in a stepless manner are achieved over a range of operating electric potentials. Thus, a nonaqueous electrolyte secondary battery that is manufactured using a niobium-containing composite oxide having an orthorhombic structure, as a negative electrode, allows its state of change (charging depth) to be easily grasped based on a change in voltage. Additionally, it is more preferable that a niobium-containing composite oxide having an orthorhombic structure further contains Na.

Further, the negative-electrode active material can contain a carbonaceous material such as graphite, silicon, or a silicon oxide. Graphite contained in the negative-electrode active material occludes and emits lithium ions. Examples of graphite include artificial graphite, natural graphite, and the like. Artificial graphite can be produced by heat treatment of a carbon precursor such as petroleum/coal-derived pitch, synthetic pitch, Mesophase pitch, coke, or resin in an inert atmosphere at temperatures of 2000 to 3000° C., for example.

The negative-electrode active material can contain one or more kinds of, or two or more kinds of, the above-described active materials. The negative-electrode active material can have the form of particles. In one example, the particles of the negative-electrode active material can contain at least one kind of particle selected from the group consisting of lithium titanate having a spinel crystal structure, lithium titanate having a ramsdellite crystal structure, a titanium oxide having an anatase crystal structure, a titanium oxide having a monoclinic crystal structure, a niobium-titanium composite oxide having a monoclinic crystal structure, and a niobium-containing composite oxide having an orthorhombic crystal structure.

The specific surface area of the particle of the negative-electrode active material is preferably in a range from 0.1 $m^2/g$ to 10 $m^2/g$. Setting the specific surface area of the particle of the negative-electrode active material to 0.1 $m^2/g$ or more sufficiently secures an occlusion site and an emission site of Li ions. Setting the specific surface area of the particle of the negative-electrode active material to 10 $m^2/g$ or less allows the negative-electrode active material to be easily handled in industrial production, thereby ensuring excellent charge-and-discharge cycling performance in the battery.

In addition, when the negative electrode mixture layer contains an electro-conductive agent, the current collection performance at the negative electrode is enhanced, and the contact resistance between the negative electrode active material and the negative electrode current collector can be suppressed. Examples of the electro-conductive agent of the negative-electrode mixture layer include carbonaceous materials such as acetylene black, a carbon fiber, graphene, fullerene, a vapor-grown carbon fiber (VGCF), coke, carbon black, graphite, a carbon nanofiber, and a carbon nanotube. As the electro-conductive agent, one of the above-described carbonaceous materials may be used alone, or a plurality of the above-described carbonaceous substances may be used. An average particle size of such carbonaceous material is preferably in a range from 0.1 μm to 10 μm. Setting the average particle size of the carbonaceous material to 0.1 μm or more effectively suppresses generation of gas. Also, setting the average particle size of the carbonaceous material to 10 μm or less achieves an excellent conductive network. Meanwhile, the specific surface area of the carbonaceous material is preferably in a range from 10 $m^2/g$ to 100 $m^2/g$. Setting the specific surface area of the carbonaceous material to 10 $m^2/g$ or more achieves an excellent conductive network. Setting the specific surface area of the carbonaceous material to 100 $m^2/g$ or less effectively suppresses generation of gas. In a case where the negative-electrode active material has electronic conductivity that is as high as that of a carbonaceous material, a larger battery capacity can be achieved by non-addition of an electro-conductive agent. Meanwhile, if an electro-conductive agent is added also in this case, by selecting an electro-conductive agent having a particle shape or size different from that of the negative-electrode active material, it is possible to achieve higher current-collecting performance. In a case where an electro-conductive agent is added to the negative-electrode active material such as a carbonaceous material, silicon, or a silicon oxide, the electro-conductive agent may occlude and emit lithium ions.

When the negative electrode mixture layer contains a binder, the gaps of the dispersed negative electrode active materials are filled with the binder, and the negative electrode active material, the electro-conductive agent, and the negative electrode current collector are bound. Examples of the binder include polytetrafluoroethylene (PTFE), polyvinylidene fluoride (PVdF), fluorine-based rubber, styrene-butadiene rubber, polyalginic acid, a polyethylene oxide, a polyacrylic acid compound, an imide compound, cellulose, and the like. Examples of cellulose used for the binder include carboxymethylcellulose (CMC), hydroxypropylmethyl cellulose (HPMC), cellulose acetate, ammonium-salt cellulose, and the like. Also, examples of a polyacrylic acid compound used for the binder include acrylic rubber, acrylic resin, and the like, and examples of an imide compound used for the binder include polyamide-imide and the like. The binder can contain one or more kinds of, or two or more kinds of, those materials.

The compounding ratio of the negative electrode active material, the electro-conductive agent, and the binder in the negative electrode mixture layer is preferably in a range from 68% by weight to 96% by weight for the negative electrode active material, from 2% by weight to 30% by weight for the electro-conductive agent, and from 2% by weight to 30% by weight for the binder. The electro-conductive agent of 2% by weight or more improves current-collecting performance of the negative-electrode mixture layer, which can improve large-current performance of the battery. Further, the binder of 2% by weight or more enhances binding between the negative-electrode mixture layer and the negative-electrode current collector, which can improve cycling performance. Meanwhile, from the viewpoint of increasing a capacity, the electro-conductive agent is preferably 30% by weight or less, and the binder is preferably 30% by weight or less. However, in a case where a carbonaceous material, silicon, or a silicon oxide is contained as the negative-electrode active material, the electro-conductive agent is preferably in a range from 0% by weight to 30% by weight.

The density of the negative-electrode mixture layer except the negative-electrode current collector is preferably in a range from 1.8 $g/cm^3$ to 2.8 $g/cm^3$. Setting the density of the negative-electrode mixture layer to the above-described range improves an energy density in the negative electrode and improves a property of holding the electrolyte. Further, the density of the negative-electrode mixture layer is more preferably in a range from 2.1 $g/cm^3$ to 2.6 $g/cm^3$. However, in a case where a carbonaceous material, silicon, or a silicon oxide is contained as the negative-electrode active material, the density is preferably in a range from 1.0 $g/cm^3$ to 1.8 $g/cm^3$.

Further, it is preferable that the negative-electrode mixture layer contains the negative-electrode active material, the binder, and the electro-conductive agent. Use of such negative-electrode mixture layer improves a property of holding an electrolyte such as a nonaqueous electrolyte in an electrode group incorporated into a battery. For example, a part of an electrolyte can be held in fine pores in a porous negative-electrode mixture layer. Further, use of the above-described preferable negative-electrode mixture layer improves ion conductivity in the negative-electrode mixture layer. This improves outputting performance and a cycle life of the battery.

The negative-electrode current collector is formed of a material that is electrochemically stable at a Li occlusion electric potential and a Li emission electric potential of the negative-electrode active material. The negative electrode current collector is a metal body, and the metal body contains at least one metal selected from the group consisting of aluminum, copper, zinc, nickel, titanium and iron. The metal body can include one of the aforementioned metals. The metal body can also contain two or more of the above-described metals. In one embodiment, the metal body is, for example, a metal foil made of one of the aforementioned metal types. In another embodiment, the metal body is, for example, a foil of an alloy containing two or more types of the aforementioned metals. In particular, it is preferable that the negative-electrode current collector is formed of copper, nickel, stainless steel, or aluminum, or is formed of aluminum alloy containing one or more elements selected from the group consisting of Mg, Ti, Zn, Mn, Fe, Cu, and Si. Examples of the shape of the metal body include a mesh, a porous body in addition to the foil. In addition, the thickness of the metal body as the negative electrode current collector is preferably in the range from 5 μm to 20 μm. Setting the thickness to the range from 5 μm to 20 μm provides appropriate balance between strength and weight reduction in the negative electrode, and can achieve a structure that is advantageous also in a bipolar electrode structure.

The negative electrode can be produced, for example, by the following method. First, a negative electrode active material, an electro-conductive agent and a binder are suspended in a solvent to prepare a slurry. Next, the prepared slurry is applied to one side or both sides of the negative electrode current collector. And the negative electrode mixture layer is formed by drying the coating film on a negative electrode current collector. Thereafter, the negative electrode current collector and the negative electrode mixture layer formed on the negative electrode current collector are pressed. Further, instead of the press, the negative electrode active material, the electro-conductive agent and the binder may be formed into pellets and used as a negative electrode mixture layer.

2) Positive Electrode

The positive electrode includes a positive electrode current collector and a positive electrode mixture layer disposed on the positive electrode current collector. The positive electrode mixture layer may be formed on one side or both sides of the positive electrode current collector. The positive electrode mixture layer contains a positive electrode active material, and can optionally contain an electro-conductive agent and a binder.

As the positive electrode active material, for example, a compound capable of absorbing and releasing lithium can be used. As a compound used for a positive electrode active material, a metal oxide and a polymer are mentioned. As the positive electrode active material, one of the following active materials may be used alone, or two or more of the following active materials may be used.

Examples of metal oxides used for the positive-electrode active material include, for example, a manganese dioxide, an iron oxide, a copper oxide, a lithium-manganese composite oxide (for example, $Li_sMn_2O_4$ (0<s≤1), $Li_sMnO_2$ (0<s≤1)), a lithium-nickel composite oxide (for example, $Li_sNiO_4$ (0<s≤1)), a lithium-cobalt composite oxide (for example, $Li_sNiO_4$ (0<s≤1)), a lithium-nickel-cobalt composite oxide (for example, $Li_sN_{1-t}Co_tO_2$; $0<s\leq1$, $0<t\leq1$), a lithium-manganese-cobalt composite oxide (for example, $Li_sMn_tCo_{1-t}O_2$; $0<s\leq1$, $0<t\leq1$), a lithium-cobalt-aluminum composite oxide, a lithium-nickel-cobalt-manganese compound oxide, a lithium-manganese-nickel composite oxide having a spinel crystal structure (for example, $Li_sMn_{2-t}Ni_tO_4$; $0<s\leq1$, $0<t\leq1$), a lithium iron oxide, lithium-fluoride iron sulfate, iron sulfate (for example, $Li_sFe_2(SO_4)_3$, ($0\leq s\leq1$)), a phosphate compound having an olivine crystal structure (for example, $Li_xFePO_4$ ($0\leq x\leq1$), $Li_xMnPO_4$ ($0<x\leq1$), $Li_xFe_{1-y}Mn_yPO_4$ ($0<x\leq1$, $0\leq y\leq1$), $Li_xCoPO_4$ ($0<x\leq1$)), a vanadium oxide (for example, $Li_sV_2O_5$ ($0\leq s\leq1$)), a nickel-, cobalt-, and manganese-containing composite oxide ($Li_xNi_{1-y-z}Co_yMn_zO_2$; $0<x\leq1$, $0<y<1$, $0<z<1$, $y+Z<1$), and the like.

Further, examples of polymer used for the positive-electrode active material include conductive polymer such as polyaniline and poly-pyrrole, and disulfide-based polymer, and the like. Moreover, sulfur, fluorocarbon, and the like can be used as the positive-electrode active material.

Further, from the viewpoint of achieving a high positive-electrode electric potential, it is preferable to use the following materials as the positive-electrode active material. More specifically, examples of a preferable positive-electrode active material include a lithium-manganese composite oxide such as $Li_xMn_2O_4$ ($0<x\leq1$) and $Li_xMnO_2$ ($0<x\leq1$), for example, a nickel-, cobalt-, and manganese-containing composite oxide such as $Li_xNi_{1-y-z}Co_yMn_zO_2$; $0<x\leq1$, $0<y<1$, $0<z<1$, $y+z<1$), for example, a lithium-nickel-aluminum composite oxide such as $Li_xNi_{1-y}Al_yO_2$; $0<x\leq1$, $0<y\leq1$), for example, a lithium-cobalt composite oxide such as $Li_xCoO_2$ ($0<x\leq1$), for example, a lithium-nickel-cobalt composite oxide such as $Li_xNi_{1-y-z}Co_yMn_zO_2$ ($0<x\leq1$, $0<y\leq1$, $0\leq z\leq1$), for example, a lithium-manganese-cobalt composite oxide such as $Li_xMn_yCo_{1-y}O_2$ ($0<x\leq1$, $0<y\leq1$), for example, a spinel lithium-manganese-nickel composite oxide such as $Li_xMn_{2-y}Ni_yO_4$ ($0<x\leq1$, $0<y<2$), for example, a lithium phosphor oxide having an olivine structure such as $Li_xFePO_4$ ($0<x\leq1$), $Li_xFe_{1-y}Mn_yPO_4$ ($0<x\leq1$, $0\leq y\leq1$), or $Li_xCoPO_4$ ($0<x\leq1$), for example, and fluorinated iron sulfate such as $Li_xFeSO_4F$ ($0<x\leq1$).

The specific surface area of the particle of the positive-electrode active material is preferably in a range from 0.1 $m^2/g$ to 10 $m^2/g$. Setting the specific surface area of the particle of the positive-electrode active material to 0.1 $m^2/g$ or more sufficiently secures occlusion and emission sites of Li ions. Setting the specific surface area of the particle of the positive-electrode active material to 10 $m^2/g$ or less allows the positive-electrode active material to be easily handled in industrial production, thereby ensuring excellent charge-and-discharge cycling performance in the battery.

In addition, when the positive electrode mixture layer contains an electro-conductive agent, the current collection performance at the positive electrode is enhanced, and the contact resistance between the positive electrode active material and the positive electrode current collector can be suppressed. The positive-electrode mixture layer can contain the same electro-conductive agent as the electro-conductive agent contained in the negative-electrode mixture layer. In this case, examples of the electro-conductive agent include carbonaceous materials such as acetylene black, a carbon fiber, graphene, fullerene, VGCF, coke, carbon black, graphite, a carbon nanofiber, and a carbon nanotube. As the electro-conductive agent, one of the above-described carbonaceous materials may be used alone, or a plurality of the above-described carbonaceous substances may be used. An average particle size of such carbonaceous material is in a range from 0.1 μm to 10 μm. Setting the average particle size of the carbonaceous material to 0.1 μm or more effectively suppresses generation of gas. Further, setting the average particle size of the carbonaceous material to 10 μm or less achieves an excellent conductive network. Further, the specific surface area of the carbonaceous material is preferably in a range from 10 $m^2/g$ to 100 $m^2/g$. Setting the specific surface area of the carbonaceous material to 10 $m^2/g$ or more achieves an excellent conductive network. Setting the specific surface area of the carbonaceous material to 100 $m^2/g$ or less effectively suppresses generation of gas.

When the positive electrode mixture layer contains a binder, the gaps of the dispersed positive electrode active materials are filled with the binder, and the positive electrode active material, the electro-conductive agent, and the positive electrode current collector are bound. The positive-electrode mixture layer can contain the same binder as the binder contained in the negative-electrode mixture layer. In this case, examples of the binder include polytetrafluoroethylene (PTFE), polyvinylidene fluoride (PVdF), fluorine-based rubber, styrene-butadiene rubber, polyalginic acid, a polyethylene oxide, a polyacrylic acid compound, an imide compound, cellulose, and the like. Examples of cellulose used for the binder include carboxymethylcellulose (CMC), hydroxypropylmethyl cellulose (HPMC), cellulose acetate, ammonium-salt cellulose, and the like. Further, examples of a polyacrylic acid compound used for the binder include acrylic rubber, acrylic resin, and the like, and examples of an imide compound used for the binder include polyamide-imide and the like. The binder can contain one or more kinds of, or two or more kinds of, those materials.

In a case where the positive-electrode mixture layer is formed only of the positive-electrode active material and the binder (not containing the electro-conductive agent), respective compounding ratios of the positive-electrode active material and the binder to the positive-electrode mixture layer are preferably as follows: the positive-electrode active material is in a range from 80% by weight to 98% by weight and the binder is in a range from 2% by weight to 20% by weight. Setting the compounding ratio of the binder to 2% by weight or more achieves sufficient electrode strength. Further, setting the compounding ratio of the binder to 20% by weight or less reduces a compounded amount of the binder that is to serve as an insulating material in the positive electrode, so that internal resistance is reduced.

Alternatively, in a case where the positive-electrode mixture layer is formed of the positive-electrode active material, the electro-conductive agent, and the binder, respective compounding ratios of the positive-electrode active material, the electro-conductive agent, and the binder to the positive-electrode mixture layer are preferably as follows: the positive-electrode active material is in a range from 77% by weight to 95% by weight, the electro-conductive agent is in a range from 3% by weight to 15% by weight, and the binder is in a range from 2% by weight to 20% by weight. Setting the compounding ratio of the electro-conductive agent to 3% by weight or more ensures conductivity of the positive electrode. Further, setting the compounding ratio of the electro-conductive agent to 15% by weight or less can reduce decomposition of an electrolytic solution in a surface of the electro-conductive agent during high-temperature storage. Further, setting the compounding ratio of the binder to 2% by weight or more achieves sufficient electrode strength. Moreover, setting the compounding ratio of the binder to 20% by weight or less reduces a compounded amount of the binder that is to serve as an insulating material in the positive electrode, so that internal resistance is reduced.

It is preferable that the positive-electrode mixture layer contains the positive-electrode active material, the binder, and the electro-conductive material. Use of such positive-electrode mixture layer improves a property of holding an electrolyte such as a nonaqueous electrolyte in an electrode group incorporated in a battery. For example, a part of an electrolyte can be held in fine pores in a porous positive-electrode mixture layer. Further, use of the above-described preferable positive-electrode mixture layer improves ion conductivity in the positive-electrode mixture layer. This improves outputting performance and a cycle life of the battery.

The positive-electrode current collector is a metallic body containing the same metal as the metal forming the negative-electrode current collector. The positive-electrode current collector can be formed so as to have the same shape and thickness as the negative-electrode current collector, and is formed in the shape of metallic foil, for example. The positive-electrode current collector is preferably either aluminum foil or aluminum-alloy foil containing one or more elements selected from the group consisting of Mg, Ti, Zn, Mn, Fe, Cu, and Si. Further, the thickness of the metallic body forming the positive-electrode current collector is preferably in a range from 5 μm to 20 μm, and is more preferably 15 μm or less.

In a case where the positive-electrode current collector is aluminum foil or aluminum-alloy foil, the purity of aluminum is preferably 99% by weight or more, and the content of transition metal such as iron, copper, nickel, or chrome is preferably 1% by mass or less. Further, the positive electrode can be manufactured using the above-described positive-electrode active material and the like by the same method as the negative electrode, for example.

3) Separator

A porous film and a nonwoven fabric or the like which are made of a synthetic resin can be used as a separator. In this case, examples of the material forming the porous film and the nonwoven fabric include polyethylene (PE), polypropylene (PP), polyethylene terephthalate (PET), cellulose, glass fiber, and polyvinylidene fluoride (PVdF). The porous film serving as the separator is preferably formed of any of polyethylene and polypropylene. A preferable porous film, in which a material forming the separator melts at a predetermined temperature, suitably interrupts a current, which improves stability.

4) Electrolyte

A nonaqueous electrolytic solution can be used as the electrolyte. The nonaqueous electrolytic solution which is the nonaqueous electrolyte is prepared by dissolving an electrolyte in an organic solvent. In the nonaqueous electrolytic solution, the concentration of the electrolyte is preferably 0.5 mol/L or more and 2.5 mol/L or less.

Examples of the electrolyte to be dissolved in the organic solvent include lithium salts such as lithium perchlorate ($LiClO_4$), lithium hexafluorophosphate ($LiPF_6$), lithium tetrafluoroborate ($LiBF_4$), lithium hexafluoroarsenide ($LiAsF_6$), lithium trifluoromethanesulfonate ($LiCF_3SO_3$) and lithium bistrifluoromethylsulfonylimide [$LiN(CF_3SO_2)_2$], and mixtures thereof. The electrolyte is preferably resistant to oxidation even at a high electric potential, and $LiPF_6$ is most preferably used as the electrolyte.

Examples of the organic solvent in which the electrolyte is dissolved include cyclic carbonates such as propylene carbonate (PC), ethylene carbonate (EC), and vinylene carbonate; chain carbonates such as diethyl carbonate (DEC), dimethyl carbonate (DMC), and methyl ethyl carbonate (MEC); cyclic ethers such as tetrahydrofuran (THF), 2-methyl tetrahydrofuran (2MeTHF), and dioxolane (DOX); chain ethers such as dimethoxy ethane (DME) and diethoxy ethane (DEE); γ-butyrolactone (GBL), acetonitrile (AN), and sulfolane (SL). These organic solvents can be used alone or as a mixed solvent.

A gel nonaqueous electrolyte can be used in place of the nonaqueous electrolytic solution. The gel nonaqueous electrolyte is prepared by combining the above-described nonaqueous electrolytic solution with a polymeric material. Examples of the polymeric material to be combined with the nonaqueous electrolytic solution include polyvinylidene fluoride (PVdF), polyacrylonitrile (PAN) and polyethylene oxide (PEO), and mixtures thereof.

As the nonaqueous electrolyte, a room-temperature molten salt (ionic melt) containing lithium ions, or a solid electrolyte may be used in place of the nonaqueous electrolytic solution and the gel nonaqueous electrolyte. Examples of the solid electrolyte include a polymer solid electrolyte and an inorganic solid electrolyte. In a case where a solid electrolyte is used as the nonaqueous electrolyte, the solid electrolyte may be substituted for the separator, and may electrically insulate the positive electrode and the negative electrode from each other.

Additionally, at least one of an isocyanate-group-containing compound and a trialkylsilyl-group-containing compound can be added to the nonaqueous electrolyte. In this case, an added amount of such an additive is preferably in a range from 0.01% by weight to 5% by weight with respect to an electrolyte, for example. Examples of an isocyanate-group-containing compound include isophorone diisocyanate, xylene diisocyanate, dicyclohexylmethane diisocyanate, diphenylmethane diisocyanate, toluene diisocyanate, hexamethylene diisocyanate, and the like. Examples of a trialkylsilyl-group-containing compound include trimethylsilyl phosphate, triethylsilyl phosphate, vinyltrimetoxysilane, vinyltriethoxysilane, γ-glicidoxypropyltrimethoxysilane, γ-glicidoxypropyltriethoxysilane, γ-methacryloxypropyltrimethoxysilane, γ-methacryloxy propyltriethoxysilane, and the like. Those additives form excellent coating films particularly for the negative electrode, and form strong binding with a hydroxy group.

5) Container Member

As the container member, either a bag-shaped container made of a laminated film or a metallic container can be used. Examples of the shape of the container member include a flat shape, a rectangular shape, a cylindrical shape, a coin shape, a button shape, a sheet shape, and a stack shape. Further, the container member may be a container member for a small battery mounted in a mobile electronic device or the like, or a container member for a large battery mounted in a vehicle or the like.

As the laminated film, for example, a multilayer film can be used, and the multilayer film can include a plurality of resin layers and a metal layer disposed between the resin layers. In this case, from the viewpoint of a weight reduction, the metal layer is preferably an aluminum foil or an aluminum alloy foil. As the resin layer, for example, a polymeric material such as polypropylene (PP), polyethylene (PE), nylon, or polyethylene terephthalate (PET) can be used. For example, the laminated film is heat-sealed to be formed into the shape of a container member. The thickness of the laminated film is preferably 0.5 mm or less, and more preferably 0.2 mm or less.

The metallic container is preferably made of at least one metal selected from the group consisting of iron, aluminum, zinc, and titanium, or an alloy of these metals. In a case where the metallic container is formed of aluminum alloy, it is preferable that the aluminum alloy contains one or more elements selected from the group consisting of magnesium, zinc, and silicon. Further, in a case where aluminum alloy forming the container contains transition metal such as iron, copper, nickel, or chrome, the content of the transition metal is preferably is 1% by mass or less. Moreover, the thickness of the metallic container is preferably 1 mm or less, more preferably 0.5 mm or less, and much more preferably 0.2 mm or less.

6) Electrode Terminal

The electrode terminal can include, for example, an external terminal and an internal terminal. In certain Example, the external terminal is, for example, a conductive tab of an electrode (positive electrode and negative electrode). In another Example, a container member having conductivity such as a metal can be provided as a container member of the battery, and an external terminal can also be formed in the container member. The internal terminal includes, for example, an electrode lead. The shape of the internal terminal is not particularly limited, and the internal terminal is formed in, for example, a strip shape, a disc shape, a washer shape, a spiral shape, or a corrugated plate shape or the like.

The electrode terminal is preferably formed of at least one metal selected from the group consisting of aluminum, zinc, titanium and iron, or an alloy of these metals. Examples of the alloy include an aluminum alloy and stainless steel.

The negative-electrode terminal is preferably formed of a material that is electrochemically stable at a Li occlusion electric potential and a Li emission electric potential of the negative-electrode active material and has conductivity. More specifically, the negative-electrode terminal is preferably formed of copper, nickel, stainless steel or aluminum, or is formed of aluminum alloy containing one or more elements selected from the group consisting of Mg, Ti, Zn, Mn, Fe, Cu, and Si. Further, from the viewpoint of reducing contact resistance with the negative-electrode current collector, the negative-electrode terminal is preferably formed of the same material as the negative-electrode current collector.

The positive-electrode terminal is preferably formed of a material that is electrochemically stable in a range from 3 V (vs. Li/Li$^+$) to 4.5 V (vs. Li/Li$^+$) and has conductivity. More specifically, the positive-electrode terminal is preferably formed of aluminum, or is formed of aluminum alloy containing one or more elements selected from the group consisting of Mg, Ti, Zn, Mn, Fe, Cu, and Si. Further, from the viewpoint of reducing contact resistance with the positive-electrode current collector, the positive-electrode terminal is preferably formed of the same material as the positive-electrode current collector.

(Characteristics of Battery)

Below, characteristics of the above-described battery will be described. Parameters indicating a state of the battery include a state of charge (SOC). In the battery, when a voltage (electric potential difference) between a positive electrode and a negative electrode has a first voltage value V1, the state of charge is 0%. Further, in the battery, when a voltage (electric potential difference) between the positive electrode and the negative electrode has a second voltage value V2 higher than the first voltage value V1, the state of charge is 100%. In the battery, a state where the state of charge is 0% is a completely-discharged state, and a state where the state of charge is 100% is a fully-charged state. In one example, the first voltage value V1 is set to 1.5 V and the second voltage value V2 is set to 3.0 V.

A state of charge is a ratio of a remaining capacity of a battery until the battery enters into a completely-discharged state, to a full charging capacity of the battery from a completely-discharged state to a fully-charged state. This state of charge is expressed in percentage, for example. It is noted that a battery capacity including a full charging capacity, a remaining capacity, and the like is represented by a product of a current and time, and is expressed in units of (A·h), (mA·h), and the like. Further, in the battery, a voltage between a positive electrode and a negative electrode increases as the state of charge increases from a completely-discharged state to a fully-charged state.

In the battery, repetition of charge and discharge or long-time storage reduces a capacity. For example, due to repetition of charge and discharge, a charging capacity (full charging capacity) of the battery from a completely-discharged state (where a state of charge is 0%) to a fully-charged state (where a state of charge is 100%), and a discharging capacity of the battery from a fully-charged state to a completely-discharged state are reduced as compared to those at a starting time of using the battery (i.e., an initial state). As causes for such reduction in battery capacity, there are considered physical deterioration of the electrode group including deterioration of the positive/negative-electrode active materials, exhaustion of the electrolytic solution, blocking in the separator, deviation of positive/negative-electrode electric potentials from a reference state such as an initial state at a starting time of using the battery, and the like.

Here, it is impossible to cause the electrode group to recover from physical deterioration. However, by a later-described recovery process under predetermined conditions, or the like, it is possible to recover deviation of positive/negative-electrode electric potentials from a reference state, and to bring the positive/negative-electrode electric potentials close to those in a reference state such as an initial state. In the battery, recovery of deviation of positive/negative-electrode electric potentials from a reference state restores a reduced capacity. Additionally, deviation of positive/negative-electrode electric potentials from a reference state is supposed to be caused by a difference in a self-discharge amount between the positive electrode and the negative electrode. Thus, it is supposed that recovery of deviation of positive/negative-electrode electric potentials from a reference state is possible by using a difference in self-discharge amount between the positive electrode and the negative electrode.

Figure 3:
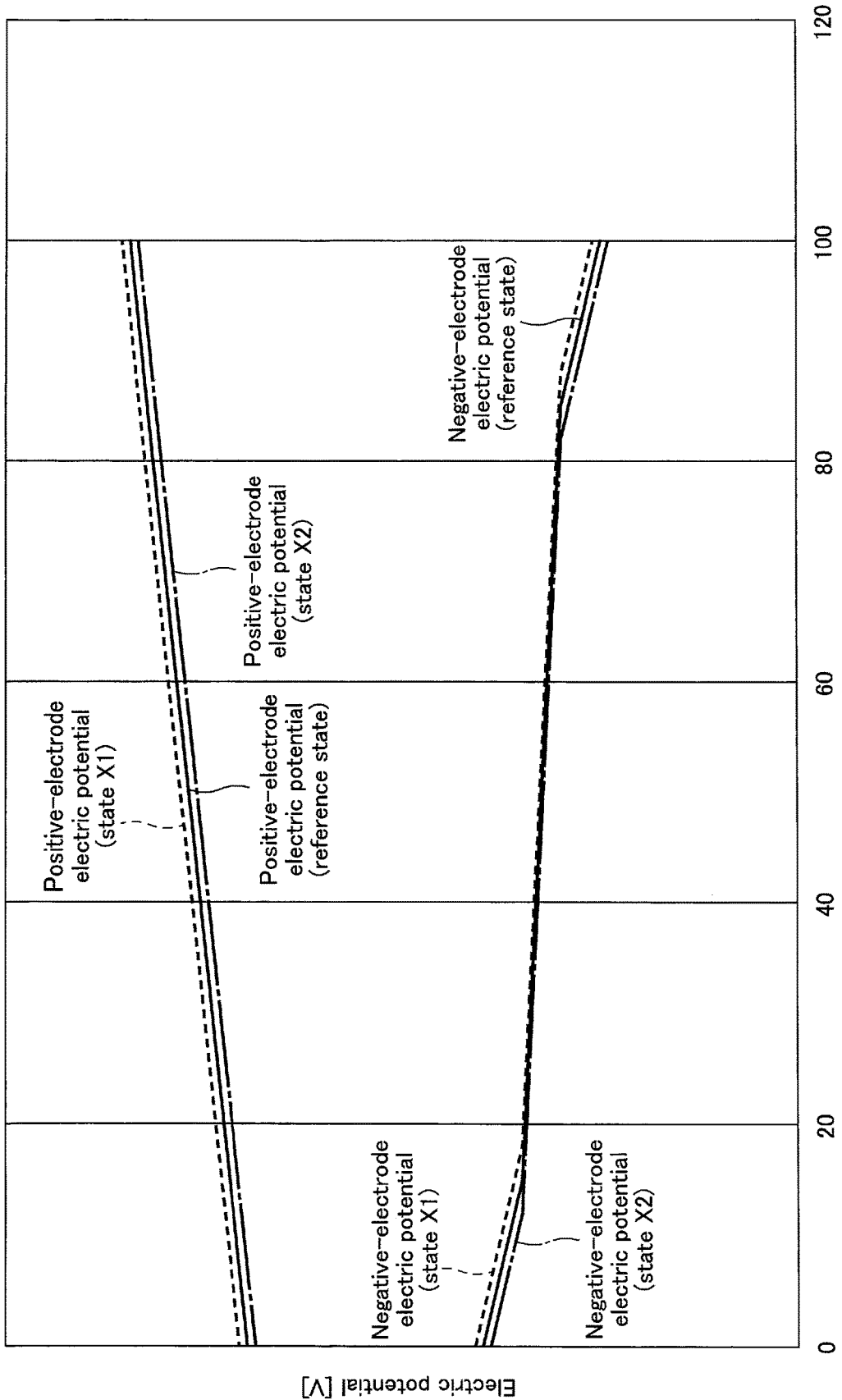
Figure 4:
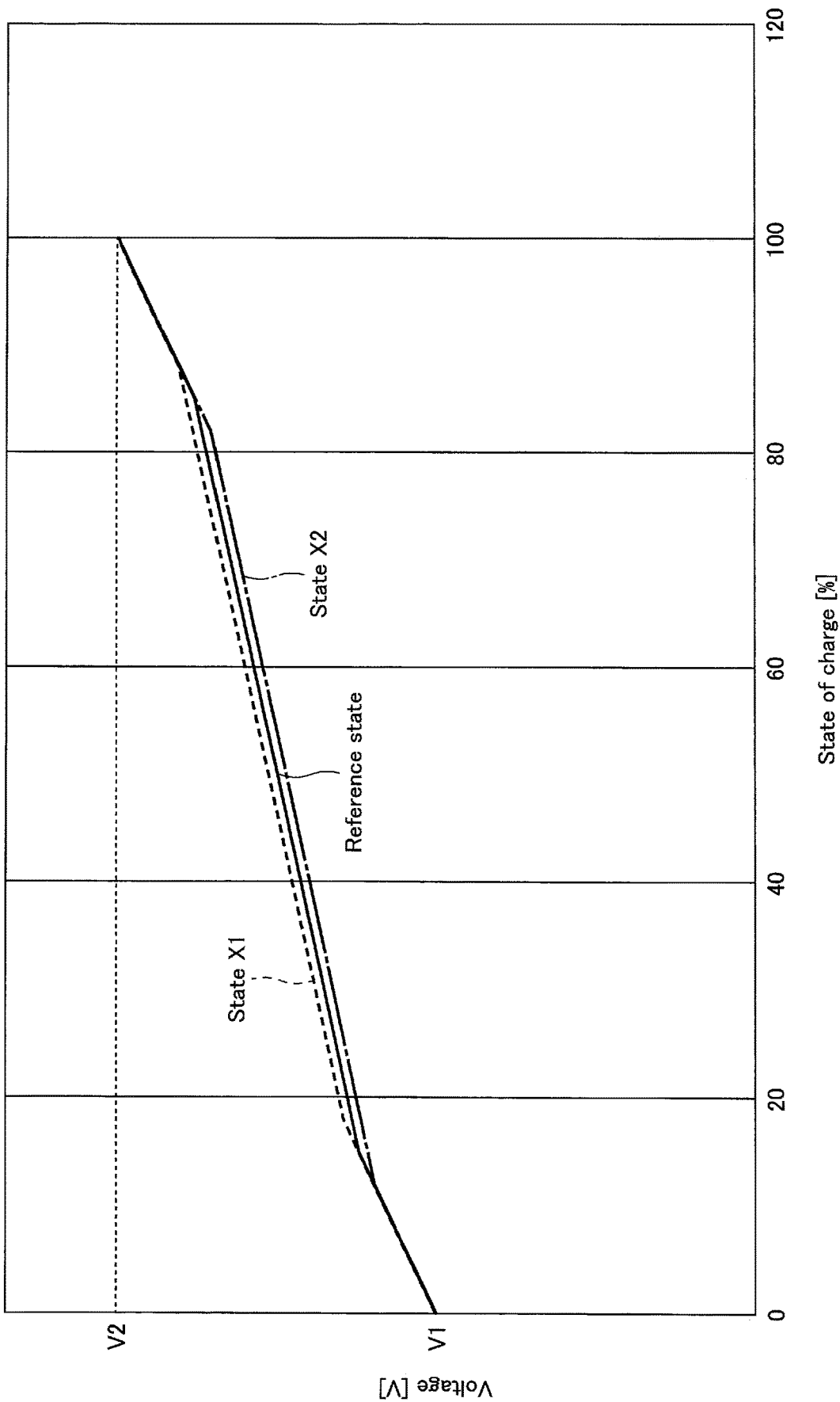
FIG. 4 is a schematic view showing a relation of a voltage between a positive electrode and a negative electrode to a state of charge of a battery in a case where a relation of each of a positive-electrode electric potential and a negative-electrode electric potential to a state of charge is as shown in the example in FIG. 3.

Below, deviation of positive/negative-electrode electric potentials from a reference state will be described. FIG. 3 shows examples of relations of positive/negative-electrode electric potentials to a state of charge, and FIG. 4 shows relations of a voltage (electric potential difference) between the positive electrode and the negative electrode to a state of charge in a case where relations of between positive/negative-electrode electric potentials to a state of charge are as shown in the example in FIG. 3. In FIG. 3, an abscissa axis represents a state of charge and an ordinate axis represents an electric potential. In FIG. 4, an abscissa axis represents a state of charge and an ordinate axis represents a voltage. In FIGS. 3 and 4, a state of charge is expressed in percentage, and an electric potential and a voltage are expressed in units of (V). Further, in FIGS. 3 and 4, positive/negative-electrode electric potentials and a voltage in a reference state such as an initial state are shown by a solid line, positive/negative-electrode electric potentials and a voltage in a state X1 are shown by a broken line, and positive/negative-electrode electric potentials and a voltage in a state X2 are shown by alternate long and short dashed lines.

As shown in FIGS. 3 and 4 and the like, in the state X1, positive/negative-electrode electric potentials in a state where a state of charge is 0% or is close to 0% are higher than those in a reference state. Further, in the state X1, positive/negative-electrode electric potentials in a state where a state of charge is 100% or is close to 100% are higher than those in a reference state. Thus, in the state X1, positive/negative-electrode electric potentials deviate toward a high-potential side with respect to a reference state. In such a state as the state X1 where positive/negative-electrode electric potentials deviate toward a high-potential side with respect to a reference state, a voltage is higher than that in the reference state over a part of a range from a completely-discharged state (where a state of charge is 0%) to a fully-charged state (where a state of charge is 100%). For example, in the state X1, a voltage is higher than that in a reference state over a whole of a state-of-charge range from 20% to 80%. Thus, deviation of positive/negative-electrode electric potentials toward a high-potential side with respect to a reference state causes a voltage curve to deviate from the reference state toward a high-voltage side over a part of a range from a completely-discharged state to a fully-charged state.

In the state X2, positive/negative-electrode electric potentials in a state where a state of charge is 0% or is close to 0% are lower than those in a reference state. Further, in the state X2, positive/negative-electrode electric potentials in a state where a state of charge is 100% or is close to 100% are lower than those in a reference state. Thus, in the state X2, positive/negative-electrode electric potentials deviate toward a low-potential side with respect to a reference state. In such a state as the state X2 where positive/negative-electrode electric potentials deviate toward a low-potential side with respect to a reference state, a voltage is lower than that in the reference state over a part of a range from a completely-discharged state (where a state of charge is 0%) to a fully-charged state (where a state of charge is 100%). For example, in the state X2, a voltage is lower than that in a reference state over a whole of a state-of-charge range from 20% to 80%. Thus, deviation of positive/negative-electrode electric potentials toward a low-potential side with respect to a reference state causes a voltage curve to deviate from a reference state toward a low-voltage side over a part of a range from a completely-discharged state to a fully-charged state.

Meanwhile, in the battery, irrespective of whether positive/negative-electrode electric potentials deviate from a reference state, a state where a voltage between the positive electrode and the negative electrode has the first voltage value V1 (1.5 V, for example) is regarded as a completely-discharged state (where SOC is 0%). Further, in the battery, irrespective of whether positive/negative-electrode electric potentials deviate from a reference state, a state where a voltage between the positive electrode and the negative electrode has the second voltage value V2 (3.0 V, for example) is regarded as a fully-charged state (where SOC is 100%). Thus, even if positive/negative-electrode electric potentials deviate from a reference state, a battery voltage in a completely-discharged state does not change from the first voltage value V1, and a battery voltage in a fully-charged state does not change from the second voltage value V2.

Further, in a state where a state of charge is 0% or is close to 0% in the example of FIG. 4, a voltage curve does not deviate, or does not substantially deviate, from a reference state, in each of the states X1 and X2. In a state where a state of charge is 100% or is close to 100% in the example of FIG. 4, a voltage curve does not deviate, or does not substantially deviate, from a reference state, in each of the states X1 and X2.

A relation between a state of charge and a positive-electrode electric potential varies depending on which one of the above-described kinds of active materials is used as the positive-electrode active material. Similarly, a relation between a state of charge and a negative-electrode electric potential varies depending on which one of the above-described kinds of active materials such as a titanium oxide, a lithium titanium oxide, a niobium- and titanium-containing composite oxide, a sodium-, niobium-, and titanium-containing composite oxide, and the like, is used as the negative-electrode active material. Thus, a voltage curve in a range between a completely-discharged state and a fully-charged state varies depending on which one of the above-described kinds of active materials is used as the positive-electrode active material or the negative-electrode active material. Nonetheless, whichever kind of active material is used as the positive-electrode active material or the negative-electrode active material, deviation of positive/negative-electrode electric potentials toward a high-potential side with respect to a reference state makes a voltage higher than that in a reference state over a part of a range between a completely-discharged state and a fully-charged state (over a state-of-charge range from 20% to 80%, for example). Similarly, whichever kind of active material is used as the positive-electrode active material or the negative-electrode active material, deviation of positive/negative-electrode electric potentials toward a low-potential side with respect to a reference state makes a voltage lower than that in a reference state over a part of a range between a completely-discharged state and a fully-charged state (over a state-of-charge range from 20% to 80%, for example).

Moreover, in a battery whose reference state is a state where positive/negative-electrode electric potentials at a starting time of use are provided, due to repetition of charge and discharge in a range in which a state of charge is relatively high, e.g., a state-of-charge range from 60% to 90%, positive/negative-electrode electric potentials are likely to deviate toward a high-potential side with respect to a reference state. Further, in a battery whose reference state is a state where positive/negative-electrode electric potentials at a starting time of use are provided, due to repetition of charge and discharge in a range where a state of charge is relatively low, e.g., a state-of-charge range from 10% to 40%, positive/negative-electrode electric potentials are likely to deviate toward a low-potential side with respect to a reference state.

[Charge and Discharge Control Device]

Below, a charge and discharge control device according to the embodiments will be described. The charge and discharge control device according to the embodiments controls charge and discharge of the above-described battery or a battery module including a plurality of the above-described batteries. That is, the charge and discharge control device controls one or more batteries. The charge and discharge control device can include a controller. The controller includes a processor or an integrated circuit (control circuit) including a central processing unit (CPU), an application specific integrated circuit (ASIC), a field programmable gate array (FPGA), or the like, and a storage medium such as a memory. The controller performs processes by executing a program or the like stored in the storage medium or the like.

The controller of the charge and discharge control device acquires information related to a positive-electrode electric potential and a negative-electrode electric potential for each of one or more batteries. Then, based on the acquired information, the controller determines whether deviation of positive/negative-electrode electric potentials from a reference state (an initial state at a starting time of use, for example) is beyond a prescribed range (normal range), for each of one or more batteries. Thereafter, in response to at least existence of a battery-to-be-restored that is a battery in which deviation of positive/negative-electrode electric potentials from a reference state is beyond the prescribed range, the controller holds the state of charge of the battery-to-be-restored in a restoration holding range for a prescribed time. The controller holds the state of charge of the battery-to-be-restored in the restoration holding range for the prescribed time, to bring the positive/negative-electrode electric potentials of the battery-to-be-restored close to a reference state such as an initial state. This restores a capacity that is reduced due to deviation of the positive/negative-electrode electric potentials from a reference state in the battery-to-be-restored.

Figure 5:
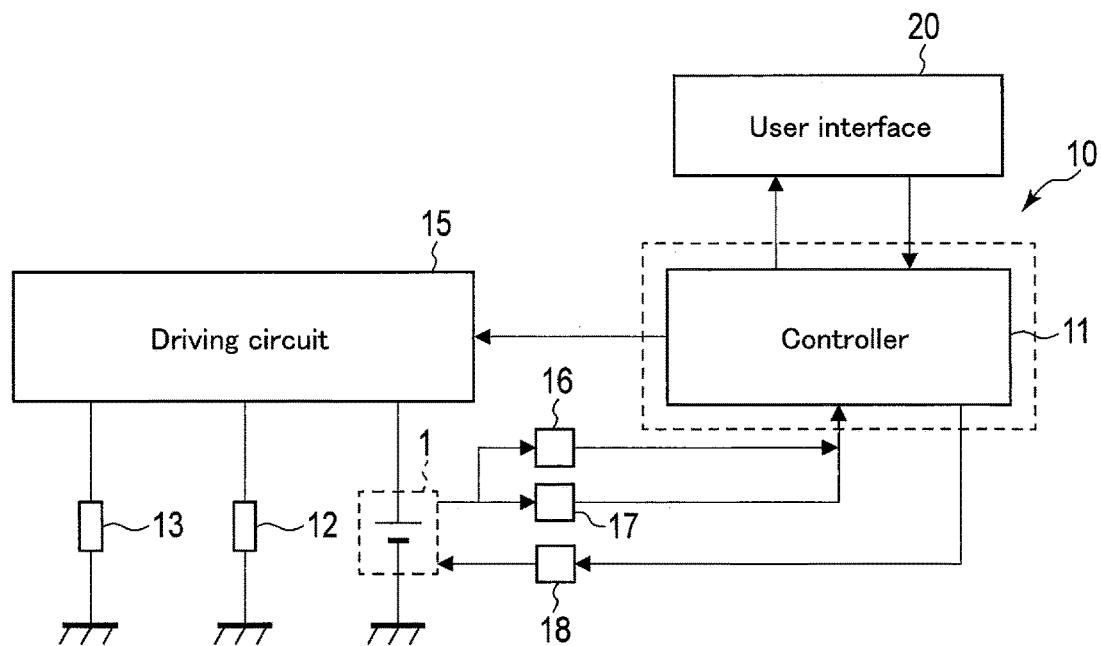
FIG. 5 is a schematic view showing an example of a system provided with the charge and discharge control device according to the embodiments.

FIG. 5 shows an example of a system provided with a charge and discharge control device that performs the above-described processes. In the system shown in FIG. 5, a charge and discharge control device 10 includes a controller 11. The controller 11 has the same configuration as the above-described controller, and performs the same processes as the above-described controller. Further, in the system shown in FIG. 5, the controller 11 of the charge and discharge control device 10 controls charge and discharge of a battery 1. The battery 1 has the same configuration as any of the above-described configurations of the battery and has the same characteristics as the above-described battery.

The system shown in FIG. 5 includes an electric power supply 12 that can supply electric power to the battery 1, and a load 13 that can receive electric power from the battery 1. The battery 1 is charged by supply of electric power from the power supply 12 or the like. The battery 1 is discharged by supply of electric power to the load 13 or the like. Examples of the electric power supply include a battery different from the battery 1, an electric power generator, and the like. Examples of the load 13 include an electric motor, a light, and the like. In another example, a capacitor to which electric power is supplied from the battery 1 may be provided in place of, or in addition to, the load 13. In this case, the battery 1 is discharged by supply of electric power to the capacitor. Then, the capacitor can store therein electric power supplied from the battery 1. In still another example, a motor generator may be provided. In this case, electric power can be supplied to the motor generator from the battery 1, and also, electric power can be supplied to the battery 1 from the motor generator. In other words, the motor generator functions as both of an electric power supply and a load.

In the system shown in FIG. 5, a driving circuit 15 is provided between each of the electric power supply 12 and the load 13, and the battery 1. The controller 11 controls driving of the driving circuit 15, thereby controlling supply of electric power from the battery 1 to the load 13, as well as supply of electric power from the electric power supply 12 to the battery 1. That is, the controller 11 controls driving of the driving circuit 15, thereby controlling charge and discharge of the battery 1. The driving circuit 15 includes a relay circuit that performs switching electric-power output from the battery 1 and electric-power input to the battery 1. Further, the driving circuit 15 includes a conversion circuit, and the conversion circuit converts electric power from the electric power supply 12 into direct-current electric power to be supplied to the battery 1. The conversion circuit also converts direct-current electric power from the battery 1 into electric power to be supplied to the load 13. The conversion circuit can include a voltage transformer circuit, a DC/AC conversion circuit, an AC/DC conversion circuit, and the like.

In the system shown in FIG. 5, a detection circuit 16, a temperature detector 17 such as a thermistor, a temperature regulator 18 such as a heater are provided. The detection circuit 16 detects a current flowing through the battery 1 and a voltage applied to the battery 1. The controller 11 acquires information about a current and a voltage that are detected by the detection circuit 16. Based on the acquired information about a current and a voltage, or the like, the controller 11 controls driving of the driving circuit 15, thereby controlling charge and discharge of the battery 1. The temperature detector 17 detects the temperature of the battery 1. The controller 11 acquires information about the temperature detected by the temperature detector 17. Based on the acquired information about the temperature or the like, the controller 11 controls activation of the temperature regulator 18. Thus, the controller 11 controls the temperature of the battery 1.

Further, in the system shown in FIG. 5, a user interface 20 is provided. The user interface 20 includes an operating member on which operations are performed by an operator or the like. Examples of the operating member include buttons, a dial, a touch panel, a remote controller, and the like. In accordance with operation instructions input with the operating member, the controller 11 controls charge and discharge or the like of the battery 1. The user interface 20 further includes a notification device that notifies an operator or the like of information. The notification device performs notification through any of screen display, issuing of sounds, turning-on of a light, and the like. The notification device provides information about a battery, such as information related to real-time positive/negative-electrode electric potentials of the battery 1, for example.

Additionally, also in a case where a battery module including a plurality of batteries is provided in place of the battery 1, the controller of the charge and discharge control device can control charge and discharge, as well as the temperature, of each of the plurality of batteries in the battery module, in the same manner as in the system shown in FIG. 5.

Figure 6:
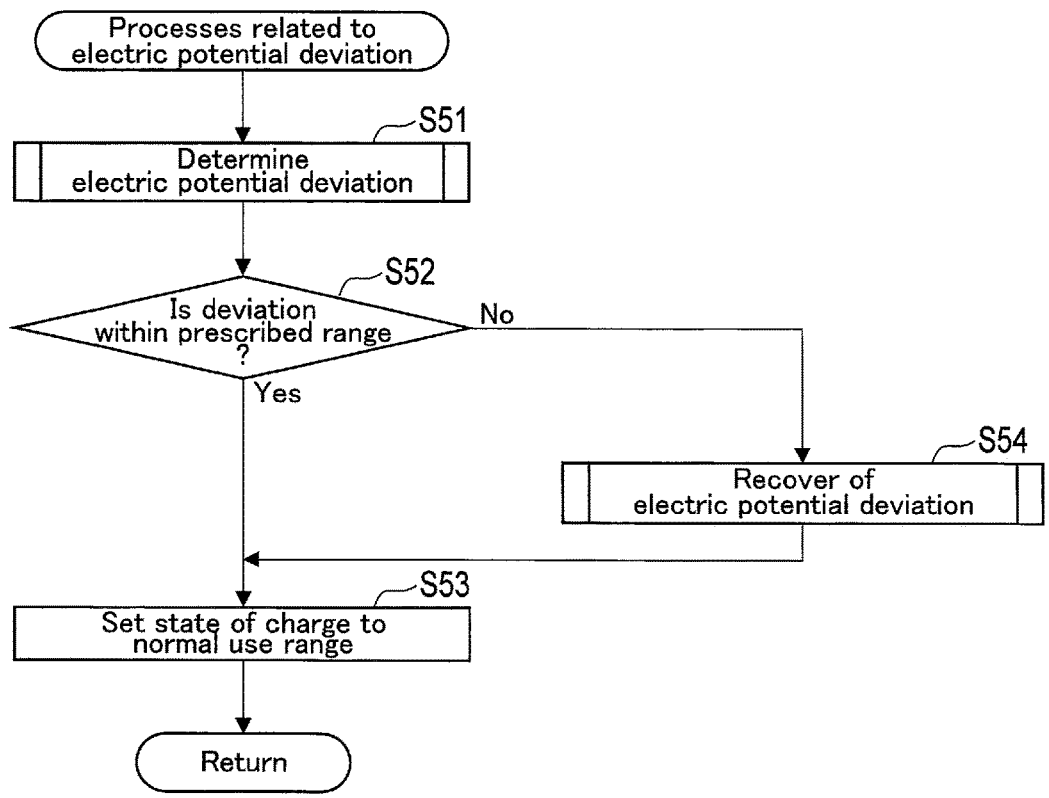

FIG. 6 shows processes related to deviation of positive/negative-electrode electric potentials of the battery 1, performed by the controller 11 of the charge and discharge control device 10 in the system of FIG. 5 or the like. In one example, the processes shown in FIG. 6 are regularly performed by the controller 11 at predetermined intervals after the battery 1 is started to be used. In another example, an operator or the like can input operation instructions for performing the processes shown in FIG. 6 in the user interface 20, and the controller 11 performs the processes shown in FIG. 6 in response to input of the operation instructions in the user interface 20.

In the processes related to deviation of positive-negative-electrode electric potentials of the battery 1, first, the controller 11 performs a determination process of deviation of positive/negative-electrode electric potentials of the battery 1 from a reference state (S51). In this case, a reference state is an initial state at a starting time of using the battery 1, for example. Information related to positive/negative-electrode electric potentials in a reference state is stored in the storage medium or the like of the controller 11. Then, the controller 11 determines whether deviation of positive/negative-electrode electric potentials of the battery 1 from a reference state is within a prescribed range (normal range), based on a result of determination in the determination process (S52). In other words, it is determined whether the determined deviation of real-time positive/negative-electrode electric potentials of the battery 1 from a reference state is beyond a prescribed range.

If deviation of positive/negative-electrode electric potentials from a reference state is within a prescribed range (S52—Yes), the controller 11 holds the state of charge (SOC) of the battery 1 in a normal use range (S53). That is, the controller 11 continues using the battery 1 with its state of charge being held in the normal use range. The normal use range is a state-of-charge range of the battery 1 in use at normal times or the like at which no anomaly occurs. In one example, the controller 11 sets the normal use range to a state-of-charge range from 60% to 90%. In another example, the controller 11 sets the normal use range to a state-of-charge range from 10% to 40%.

If the deviation of positive/negative-electrode electric potentials from a reference state is beyond a prescribed range (S52—No), the controller 11 performs a recovery process of the deviation of positive/negative-electrode electric potentials from the reference state (S54). Specifically, if the deviation of positive/negative-electrode electric potentials of the battery 1 from a reference state is beyond a prescribed range, the controller 11 determines that the battery 1 is a battery-to-be-restored and performs the recovery process of recovering of the deviation of positive/negative-electrode electric potentials. When the recovery process of the deviation of positive/negative-electrode electric potentials is ended, the controller 11 sets the state of charge of the battery 1 to the above-described normal use range (S53).

In one example, if the determined deviation of positive/negative-electrode electric potentials from a reference state is beyond a prescribed range (S52—No), the controller 11 causes the notification device of the user interface 20 to notify an operator or the like that the battery 1 is a battery-to-be-restored, through activation or the like of the notification device. In this case, the operator or the like can input operation instructions for the above-described recovery process of electric potential deviation, with the operating member or the like of the user interface 20. After causing the notification device to notify the operator or the like that the battery 1 is a battery-to-be-restored, in response to input of operation instructions for the recovery process of electric potential deviation, the controller 11 performs the recovery process of the electric potential deviation.

Further, in a system in which charge and discharge of each of a plurality of batteries in a battery module are controlled by a controller, the controller determines whether deviation of positive/negative-electrode electric potentials from a reference state is beyond a prescribed range (normal range), for each of the plurality of batteries. Then, if deviation of positive-negative-electrode electric potentials from a reference state is within a prescribed range in each of the plurality of batteries, the controller 11 holds the state of charge (SOC) of each of the plurality of batteries in the normal use range.

On the other hand, if there exists a battery-to-be-restored in which the determined deviation of positive/negative-electrode electric potentials from a reference state is beyond a prescribed range among the plurality of batteries, the controller performs the recovery process of the electric potential deviation on the battery-to-be-restored. In other words, if any of the plurality of batteries is a battery-to-be-restored in which the determined deviation of positive/negative-electrode electric potentials from a reference state is beyond a prescribed range, the controller performs the recovery process of the electric potential deviation on the battery-to-be-restored. The recovery process of electric potential deviation may be performed on not only the battery-to-be-restored, but also batteries other than the battery-to-be-restored in the plurality of batteries of the battery module. When the recovery process of the deviation of positive/negative-electrode electric potentials from a reference state on the battery-to-be-restored is ended, the controller 11 sets the state of charge of each of the plurality of batteries to the normal use range.

In one example, if there exists a battery-to-be-restored in which the determined deviation of positive/negative-electrode electric potentials from a reference state is beyond a prescribed range among the plurality of batteries, the controller 11 causes the notification device of the user interface 20 to notify an operator or the like of existence of the battery-to-be-restored through activation or the like of the notification device. In this case, the operator or the like can input operation instructions for the above-described recovery process of electric potential deviation with the operating member or the like of the user interface 20. After causing the notification device to notify the operator or the like of existence of the battery-to-be-restored, in response to input of the operation instructions for the recovery process of electric potential deviation, the controller 11 performs the recovery process of the electric potential deviation on the battery-to-be-restored.

(Determination Process of Deviation of Positive/Negative-Electrode Electric Potentials from a Reference State)

Below, a determination process of electric potential deviation from a reference state (S51 in FIG. 6, for example) will be described. By the determination process, there is provided information about whether deviation of positive/negative-electrode electric potentials from a reference state is within a prescribed range (normal range), for each of one or more batteries. Then, based on the information provided by the determination process, the controller determines whether deviation of positive/negative-electrode electric potentials from a reference state is within a prescribed range for each of one or more batteries in the same manner as in the above-described process at S52 or the like. In one example, by the determination process, there is provided information about whether is a high-potential side or a low-potential side toward which positive/negative-electrode electric potentials of a battery-to-be-restored deviate from a reference state.

Figure 7:
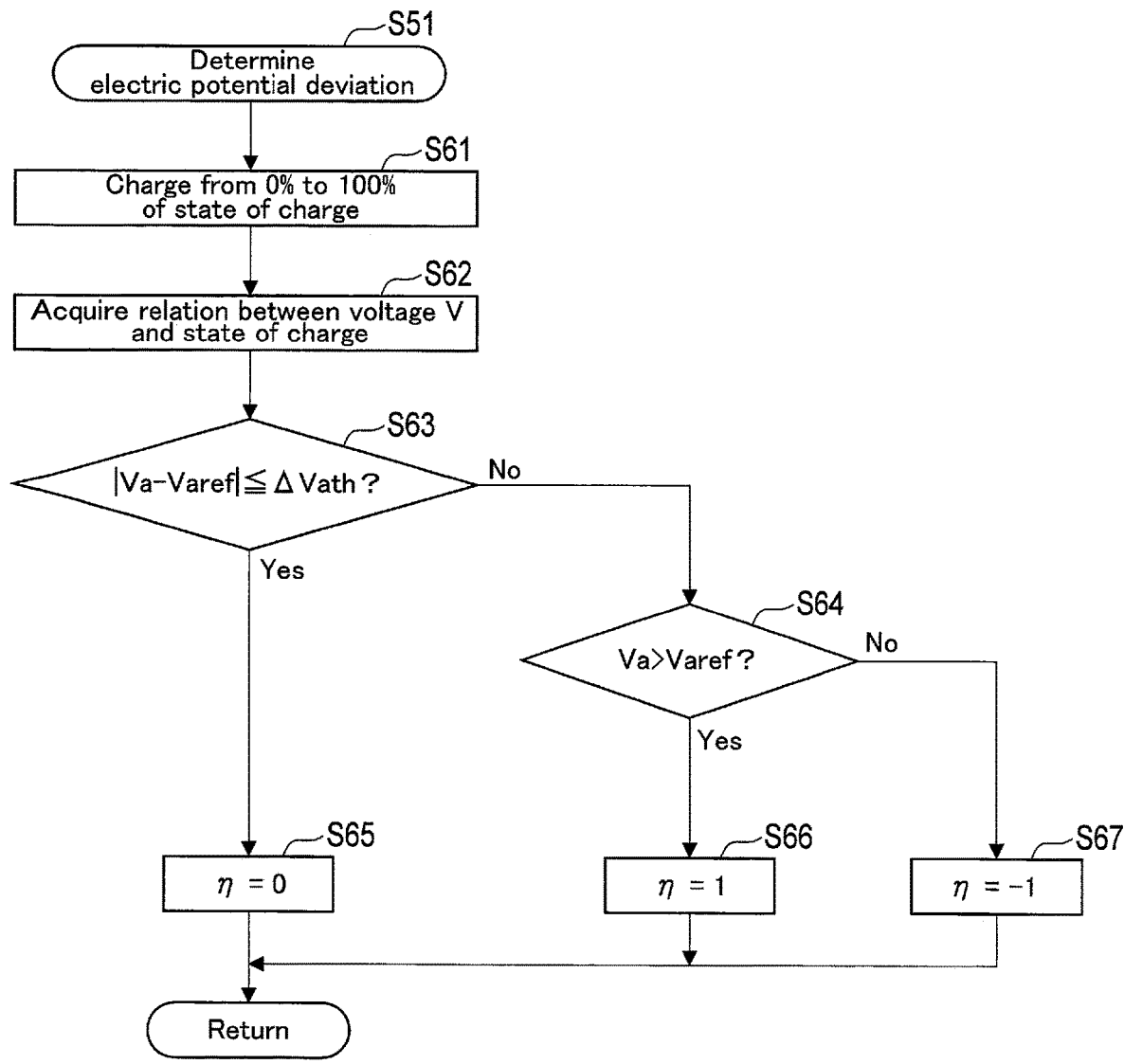

FIG. 7 shows a first embodiment of the determination process of electric potential deviation from a reference state. In the embodiment of FIG. 7, the determination process of electric potential deviation from a reference state is performed on a battery. In the determination process (S51) in FIG. 7, the controller discharges the battery to a completely-discharged state (where a state of charge is 0%), and thereafter charges the battery in a completely-discharged state, to a fully-charged state (where a state of charge is 100%) under predetermined conditions (S61). At that time, the battery is charged with a constant current at a rate of 1C or the like, for example. Then, the controller acquires a relation between a voltage V and a state of charge of the battery (S62). In other words, the controller acquires information indicating a relation of a voltage between the positive electrode and the negative electrode to a state of charge, for the battery.

In one example, in the charge at S61, the controller acquires a voltage curve (charge voltage curve) from a completely-discharged state to a fully-charged state as the information indicating a relation of the voltage V to a state of charge, by plotting of battery voltages with respect to states of charge, or the like. In another example, the controller discharges the battery so that the battery in a fully-charged state enters into a completely-discharged state under predetermined conditions, instead of performing the charge at S61. Then, in this discharge, the controller acquires a voltage curve (discharge voltage curve) from a fully-charged state to a completely-discharged state as the information indicating a relation of the voltage V to a state of charge, by plotting of battery voltages with respect to states of charge, or the like.

In the battery, as described above, deviation of positive/negative-electrode electric potentials from a reference state toward a high-potential side causes a voltage curve to deviate from a reference state toward a high-voltage side over a part of a range from a completely-discharged state to a fully-charged state. Meanwhile, in the battery, deviation of positive/negative-electrode electric potentials from a reference state toward a low-potential side causes a voltage curve to deviate from a reference state toward a low-voltage side over a part of a range from a completely-discharged state to a fully-charged state. Thus, the information acquired by the controller, indicating a relation of the voltage V to a state of charge, is included in the information related to positive/negative-electrode electric potentials of the battery.

Then, the controller acquires a real-time voltage value Va at which a state of charge has a specified value, from the information indicating a relation between the voltage V and a state of charge. Further, the controller acquires a voltage value Varef at which a state of charge has the specified value in a reference state. Meanwhile, the information indicating a relation of the voltage V to a state of charge in a reference state is stored in the storage medium or the like. Further, the specified value is any value that is more than 0% and less than 100%. However, in the above-described battery, due to deviation of positive/negative-electrode electric potentials from a reference state, voltage deviation from a reference state becomes significant particularly in a state-of-charge range from 20% to 80%. Thus, the specified value is preferably any value in a range from 20% to 80%, and in one example, the specified value is 50%.

Then, in the determination process of FIG. 7, the controller performs processes by using the real-time voltage value Va at which a state of charge has the specified value, and using the voltage value Varef at which a state of charge has the specified value in a reference state. Specifically, the controller determines whether an absolute value of a difference between the voltage value Va and the voltage value Varef is a threshold value $\Delta$Vath or less (S63). If an absolute value of a difference between the voltage value Va and the voltage value Varef is the threshold value $\Delta$Vath or less (S63—Yes), the controller sets a determination parameter $\eta$ to 0.

On the other hand, if an absolute value of a difference between the voltage value Va and the voltage value Varef is more than the threshold value $\Delta$Vath (S63—No), the controller determines whether the real-time voltage value Va is more than the voltage value Varef in a reference state (S64). If the voltage value Va is more than the voltage value Varef (S64—Yes), the controller sets the determination parameter $\eta$ to 1 (S66). On the other hand, if the voltage value Va is less than the voltage value Varef (S64—No), the controller sets the determination parameter $\eta$ to $-1$ (S67).

In the processes in FIG. 7, the determination parameter $\eta$ is provided as information about whether deviation of positive/negative-electrode electric potentials from a reference state is within a prescribed range. When the determination parameter $\eta$ is set to 0, the controller determines that deviation of positive/negative-electrode electric potentials from a reference state is within a prescribed range. In other words, the controller determines that the battery is not a battery-to-be-restored. On the other hand, when the determination parameter $\eta$ is set to either 1 or $-1$, the controller determines that the deviation of positive/negative-electrode electric potentials of the battery from a reference state is beyond a prescribed range. In other words, the controller determines that the battery is a battery-to-be-restored. Moreover, when the determination parameter n is set to 1, the controller determines that the positive/negative-electrode electric potentials of the battery (battery-to-be-restored) deviate from a reference state toward a high-potential side. When the determination parameter $\eta$ is set to $-1$, the controller determines that the positive/negative-electrode electric potentials of the battery (battery-to-be-restored) deviate from a reference state toward a low-potential side.

In one modification, the controller acquires real-time voltage values in plural states where different states of charge are provided, in place of the voltage value Va, and acquires an average value Vb of the acquired plural voltage values. In one example, the controller acquires real-time voltage values in a state where a state of charge is 30%, a state where a state of charge is 50%, and a state where a state of charge is 70%, respectively, and uses an average of the three voltage values as the real-time average value Vb. The controller acquires voltage values in the above-described plural states where different states of charge are provided, also regarding a reference state, and acquires an average value Vbref of the acquired plural voltage values. In the present modification, the controller performs the determination process in the same manner as in the processes at S63 and S64 by using the average values Vb and Vbref in place of the voltage values Va and Varef, and sets the determination parameter $\eta$ in the same manner as in the processes at S65 to S67. Then, the controller performs determination in the above-described manner, based on the determination parameter $\eta$.

In another modification, the controller acquires a shift amount $\epsilon$ of a voltage curve from a reference state over a part of a range from a completely-discharged state to a fully-charged state, in place of the voltage values Va and Varef. Then, the controller determines whether the shift amount $\epsilon$ is a threshold value $\epsilon$th or less, instead of performing the process of S63. If the shift amount $\epsilon$ is the threshold value $\epsilon$th or less, the controller sets the determination parameter $\eta$ to 0. On the other hand, if the shift amount $\epsilon$ is more than the threshold value $\epsilon$th, the controller determines whether the shift of the voltage curve from a reference state is toward a high-voltage side or a low-voltage side, instead of performing the process of S64. Then, if the shift of the voltage curve is toward a high-voltage side, the controller sets the determination parameter $\eta$ to 1. On the other hand, if the shift of the voltage curve is toward a low-voltage side, the controller sets the determination parameter $\eta$ to $-1$. Also in the present modification, the controller performs determination in the above-descried manner, based on the determination parameter $\eta$.

In still another modification, the controller acquires a real-time state of charge αa at which the voltage V has a specified voltage value, from the information indicating a relation between the voltage V and a state of charge of the battery. In this case, the controller acquires a state of charge αaref at which the voltage V has the specified voltage value in a reference state. It is noted that the specified voltage value is any value that is more than the first voltage value V1 and is less than the second voltage value V2. However, in the above-described battery, even if positive/negative-electrode electric potentials deviate from a reference state, a voltage does not significantly deviate from a reference state in each of a state where a state of charge is 0% or is close to 0%, and a state where a state of charge is 100% or is close to 100%. Thus, the specified voltage value is preferably a value far from the first voltage value V1 and the second voltage value V2, and is set to an average value of the first voltage value V1 and the second voltage value V2 or to a value close to the average value, for example. In one example, the first voltage value V1 is 1.5 V and the second voltage value V2 is 3.0 V, so that the specified voltage value is set to 2.25 V.

In the present modification, the controller performs the processes by using the real-time state of charge αa at which the voltage V has the specified voltage value and using the state of charge αaref at which the voltage V has the specified value in a reference state, in place of the voltage values Va and Varef. Specifically, the controller determines whether an absolute value of a difference between the state of charge αa and the state of charge αaref is a threshold value Δαath or less, instead of performing the process of S63. If an absolute value of a difference between the state of charge αa and the state of charge αaref is the threshold value Δαath or less, the controller sets the determination parameter η to 0.

On the other hand, if an absolute value of a difference between the state of charge αa and the state of charge αaref is more than the threshold value Δαath, the controller determines whether the real-time state of charge αa is less than the state of charge αaref in a reference state, instead of performing the process of S64. Then, if the state of charge αa is less than the state of charge αaref, in other words, if the state of charge αa is closer to 0% than the state of charge αaref, the controller sets the determination parameter η to 1. On the other hand, if the state of charge αa is more than the state of charge αaref, in other words, if the state of charge αa is closer to 100% than the state of charge αaref, the controller sets the determination parameter η to −1. Also in the present modification, the controller performs determination in the above-descried manner, based on the determination parameter η.

In one modification, the controller acquires real-time states of charge in plural states where different voltage values are provided, in place of the state of charge αa, and acquires an average value αb of the acquired plural states of charge. In one example, the first voltage value V1 is 1.5 V and the second voltage value V2 is 3.0 V. Thus, the controller acquires real-time states of charge in states where a voltage is 2.0 V, 2.25 V, and 2.5 V, respectively, and uses an average of the three states of charge as the real-time average value αb. The controller acquires states of charge in the above-described plural states where different voltage values are provided, also regarding a reference state, and acquires an average value αbref of the acquired plural states of charge. In the present modification, the controller performs the determination process by using the average values αb and αbref in the same manner as in the process using the states of charge αa and αaref, and sets the determination parameter η. Then, the controller performs determination in the above-described manner, based on the determination parameter η.

In a system in which charge and discharge of each of a plurality of batteries in a battery module are controlled by a controller, the controller acquires information indicating a relation of a voltage to a state of charge for each of the plurality of batteries. Then, the controller performs the same process as any process in the above-described embodiment and the like based on the information indicating a relation of a voltage to a state of charge, thereby setting the determination parameter η for each of the plurality of batteries. Thereafter, the controller determines whether deviation of positive/negative-electrode electric potentials from a reference state is within a prescribed range based on the determination parameter η in the same manner as in the above-described embodiment and the like, for each of the plurality of batteries.

Further, in a configuration in which charge and discharge of a plurality of batteries in a battery module are controlled by a controller, the controller may acquire voltages applied by the plurality of batteries, not a voltage applied by a battery. In this case, based on information indicating relations of the voltages applied by the plurality of batteries to states of charge, the controller determines deviation of positive/negative-electrode electric potentials of each of the plurality of batteries. Thus, the information indicating relations of the voltages applied by the plurality of batteries to states of charge is acquired as information related to positive electrode electric potential and negative electrode electric potential of the respective batteries. Also in this case, in the same manner as in the determination based on the information indicating a relation of a voltage applied by a battery to a state of charge, the controller determines deviation of positive/negative-electrode electric potentials based on the information indicating relation of voltages applied by the plurality of batteries to state of charge.

Figure 8:
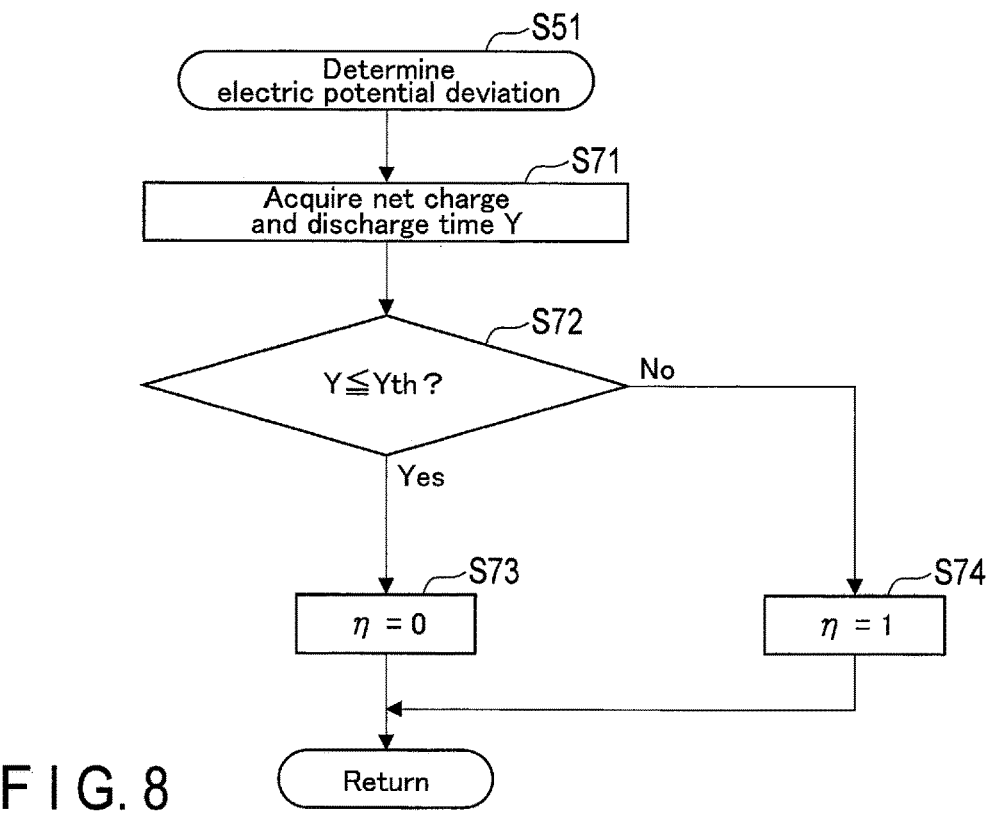

FIG. 8 shows a second embodiment of the determination process of electric potential deviation from a reference state. In the embodiment shown in FIG. 8, the determination process of electric potential deviation from a reference state is performed on a battery. In the determination process (S51) in FIG. 8, a controller acquires a net charge/discharge time Y elapsed from a starting time of using the battery or from the last recovery process of electric potential deviation (S61). The net charge/discharge time Y of the battery is included in information about a use history of the battery. Then, the controller determines whether the net charge/discharge time Y is a threshold value Yth or less (S62).

In the embodiment shown in FIG. 8, the controller sets a normal use range to a range in which a state of charge is relatively high, such as a state-of-charge range from 60% to 90%, and repeats charge and discharge so that a state of charge is held in the set normal use range at normal times or the like at which no anomaly occurs. Thus, in the present embodiment, due to repetition of charge and discharge of the battery, positive/negative-electrode electric potentials of the battery deviate from a reference state (initial state) toward a high-potential side. Further, in the present embodiment, information indicating a relation between a use history of the battery such as the above-described net charge/discharge time Y and deviation of positive/negative-electrode electric potentials from a reference state is stored in the storage medium or the like. Then, the controller determines how long the net charge/discharge time Y is when deviation of positive/negative-electrode electric potentials from a reference state toward a high-potential side exceeds a prescribed range, based on the above-described stored information, and sets the threshold value Yth based on a result of the determination. Because of such setting of the threshold value Yth as described above, the information about a use history of the battery such as the net charge/discharge time Y or the like is included in the information related to a positive-electrode electric potential and a negative-electrode electric potential of the battery.

If the net charge/discharge time Y is the threshold value Yth or less (S72—Yes), the controller sets a determination parameter $\eta$ to 0 (S73). On the other hand, if the net charge/discharge time Y is longer than the threshold value Yth (S72—No), the controller sets the determination parameter $\eta$ to 1 (S74). Also in the present embodiment, like the above-described embodiment, when the determination parameter $\eta$ is set to 0, the controller determines that deviation of positive/negative-electrode electric potentials of the battery from a reference state is within a prescribed range (normal range). On the other hand, when the determination parameter $\eta$ is set to 1, the controller determines that the deviation of positive/negative-electrode electric potentials of the battery from a reference state is beyond a prescribed range. Further, when the determination parameter $\eta$ is set to 1, the controller determines that positive/negative-electrode electric potentials of the battery (battery-to-be-restored) deviate from a reference state toward a high-potential side.

Additionally, in the present embodiment, the battery is charged and discharged with its state of charge being held in a relatively high state-of-charge range at normal times, so that positive/negative-electrode electric potentials deviate from a reference state toward a high-potential side, and do not deviate from a reference state toward a low-potential side. Thus, without a process of setting the determination parameter $\eta$ to −1, the controller properly determines deviation of positive/negative-electrode electric potentials of the battery from a reference state.

In one modification, a controller sets a normal use range to a range in which a state of charge is relatively low, such as a state-of-charge range from 10% to 40%, and repeats charge and discharge so that a state of charge is held in the set normal use range at normal times or the like at which no anomaly occurs. Thus, in the present modification, due to repetition of charge and discharge of the battery, positive/negative-electrode electric potentials of the battery deviate from a reference state (initial state) toward a low-potential side. Also in the present modification, like the embodiment shown in FIG. 8 or the like, determination is performed by using the net charge/discharge time Y. If the net charge/discharge time Y is the threshold value Yth or less, the determination parameter $\eta$ is set to 0. In this case, the controller determines that deviation of positive/negative-electrode electric potentials of the battery from a reference state is within a prescribed range.

However, in the present modification, if the net charge/discharge time Y is more than the threshold value Yth, the determination parameter $\eta$ is set to −1. Then, the controller determines that the deviation of positive/negative-electrode electric potentials of the battery from a reference state is beyond a prescribed range, and also determines that positive/negative-electrode electric potential of the battery (battery-to-be-restored) deviate from a reference state toward a low-potential side. In the present modification, the battery is charged and discharged with its state of charge being held in a relatively low state-of-charge range at normal times, so that positive/negative-electrode electric potentials deviate from a reference state toward a low-potential side and do not deviate from a reference state toward a high-potential side. Thus, without a process of setting the determination parameter $\eta$ to 1, the controller properly determines deviation of positive/negative-electrode electric potentials of the battery from a reference state.

In another modification, a controller acquires an elapsed time Z from a starting time of using a battery or from the last recovery process of electric potential deviation, in place of the net charge/discharge time Y, as the information about a use history of the battery. Further, the controller sets a threshold value Zth regarding the elapsed time Z. Then, in the same manner as in the embodiment shown in FIG. 8 and its modifications, the controller determines whether the elapsed time Z is the threshold value Zth or less. If the elapsed time Z is the threshold value Zth or less, the controller sets the determination parameter $\eta$ to 0. On the other hand, if the elapsed time Z is longer than the threshold value Zth, the controller sets the determination parameter $\eta$ to 1 or −1. Then, the controller performs determination in the above-described manner based on the determination parameter $\eta$.

In a system in which charge and discharge of each of a plurality of batteries in a battery module are controlled by a controller, the controller acquires information about a use history such as the net charge/discharge time Y for each of the plurality of batteries. Then, the controller performs the same processes as those in any of the embodiment shown in FIG. 8 and its modifications, based on the information about a use history, thereby setting the determination parameter $\eta$ for each of the plurality of batteries. In the same manner as in the above-described embodiment or the like, the controller determines whether deviation of positive/negative-electrode electric potentials from a reference state is within a prescribed range, based on the determination parameter for each of the plurality of batteries.

In the above-described embodiment and the like, by performing the determination process of electric potential deviation from a reference state, the controller properly determines that deviation of positive/negative-electrode electric potentials from a reference state is within a prescribed range, for each of one or more batteries. This achieves proper determination of reduction in a capacity caused by deviation of positive/negative-electrode electric potentials from a reference state, for each of one or more batteries. In other words, it is properly determined whether a battery is a battery-to-be-restored, or whether a battery-to-be-restored exists among a plurality of batteries in a battery module. Further, in the above-described embodiment and the like, by performing the determination process of electric potential deviation from a reference state, the controller properly determines whether ins a high-potential side or low-potential side toward which positive/negative-electrode electric potentials of a battery (battery-to-be-restored) deviate from a reference state.

(Recovery Process of Deviation of Positive/Negative-Electrode Electric Potentials from a Reference State)

Below, the recovery process of electric potential deviation from a reference state (S54 in FIG. 6, for example) will be described. The recovery process is performed on a battery-to-be-restored that is a battery in which the determined deviation of positive/negative-electrode electric potentials from a reference state is beyond a prescribed range. Further, in a case where a battery-to-be-restored exists among a plurality of batteries in a battery module, the recovery process may be performed on the batteries other than the battery-to-be-restored. In the recovery process, the controller holds the state of charge of a battery that is an object of restoration such as a battery-to-be-restored, in a restoration holding range (first range) for a prescribed time. The recovery process brings positive/negative-electrode electric potentials of the battery close to a reference state such as an initial state. This restores a capacity that is reduced due to deviation of positive/negative-electrode electric potentials from a reference state in the battery-to-be-restored or the like.

Figure 9:
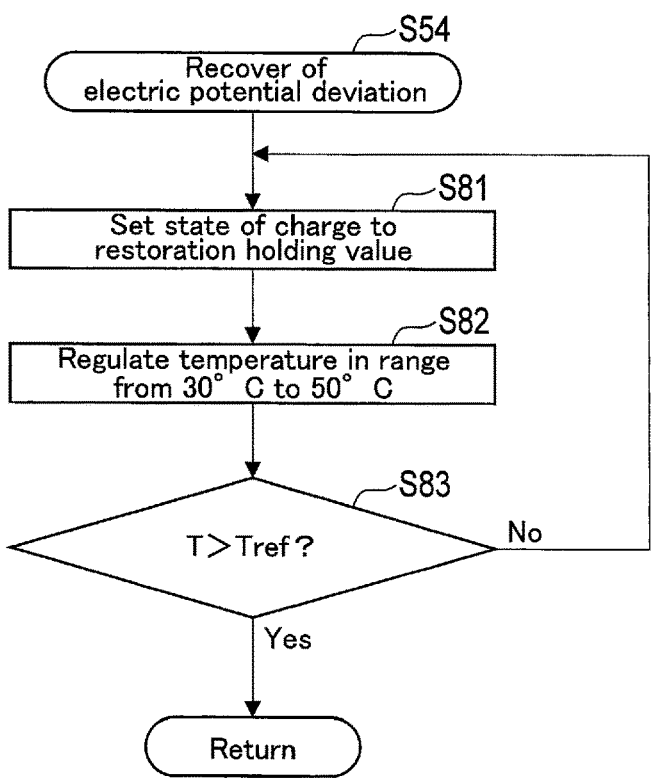

FIG. 9 shows a first embodiment of the recovery process of electric potential deviation from a reference state. In the embodiment shown in FIG. 9, the recovery process of electric potential deviation from a reference state is performed on a battery. In the recovery process (S54) in FIG. 9, a controller controls charge and discharge of the battery so that the state of charge of the battery is held at a restoration holding value (set value) (S81). This allows the battery (battery-to-be-restored) to be stored in a state where its state of charge has the restoration holding value. Thus, in the present embodiment, the restoration holding value is set as the above-described restoration holding range (first range). Then, the controller regulates the temperature of the battery (battery-to-be-restored) in a range from 30° C. to 50° C. (S82). At that time, the controller controls activation of the temperature regulator such as a heater based on information about the temperature of the battery provided from the temperature detector such as a thermistor, and regulates the temperature of the battery. Then, the controller determines whether an elapsed time T from a starting time of the recovery process exceeds a reference time Tref (S83). In one example, the reference time Tref is set to three days.

If the elapsed time T is the reference time Tref or less (S83—No), the process is returned to S81, and the controller sequentially performs processes at S81 and afterward. Specifically, charge and discharge of the battery are controlled such that the state of charge of the battery is kept being held at the restoration holding value, and the temperature of the battery is kept being regulated in a range from 30° C. to 50° C. If the elapsed time T exceeds the reference time Tref (S83—Yes), the controller ends the recovery process of electric potential deviation. Then, the controller sets the state of charge of the battery to the above-described normal use range (the second range) (S53).

Figure 10:
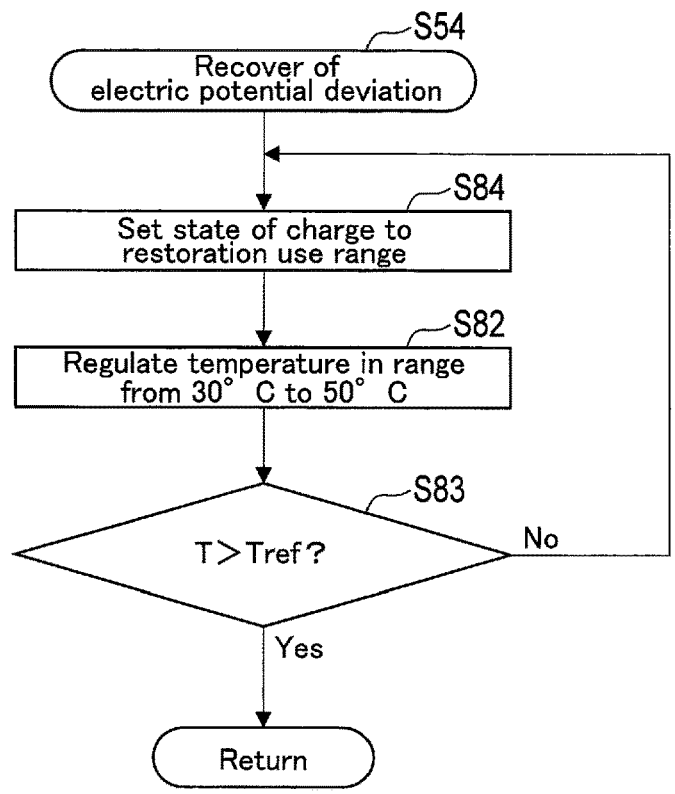

FIG. 10 shows a second embodiment of the recovery process of electric potential deviation from a reference state. In the embodiment shown in FIG. 10, the recovery process of electric potential difference from a reference state is performed on a battery. In the recovery process (S54) in FIG. 10, a controller holds the state of charge of the battery in a restoration use range (set range) (S84). Thus, the controller controls charge and discharge of the battery (battery-to-be-restored) so that its state of charge is in the restoration use range, and thus the battery is used with its state of charge being in the restoration use range. Hence, in the present embodiment, the restoration use range is set as the above-described restoration holding range (first range). Also in the embodiment shown in FIG. 10, like the embodiment shown in FIG. 9, processes of S82 and S83 are performed. In the present embodiment, if the elapsed time T is the reference time Tref or less at S83 (S83—No), the process is returned to S84, and the controller performs sequentially processes at S84 and afterward. Specifically, the state of charge of the battery is kept being held in the restoration use range and the temperature of the battery is kept being regulated in a range from 30° C. to 50° C.

Meanwhile, in a system in which charge and discharge of each of a plurality of batteries in a battery module are controlled by a controller, when a battery-to-be-restored exists among the plurality of batteries, the controller performs the recovery process on the battery-to-be-restored in the same manner as in any of the embodiment shown in FIG. 8, the embodiment shown in FIG. 9, and the like. Specifically, the controller holds the state of charge of the battery-to-be-restored in the restoration holding range (first range) corresponding to the restoration holding value or the restoration use range, for a prescribed time.

In the above-described embodiments and the like, the restoration holding range (first range) corresponding to the restoration holding value or the restoration use range that is set by the controller or the like is different from the above-described normal use range (second range). Thus, in the recovery process, the controller holds the state of charge of the battery in a range different from the range in which the state of charge is held at times of normal use.

For example, in a case where a range in which a state of charge is relatively high such as a state-of-charge range from 60% to 90% is set as the normal use range, due to repetition of charge and discharge in the normal use range, positive/negative-electrode electric potentials of a battery deviate from a reference state (initial state) toward a high-potential side as described above. In this case, the controller sets the restoration holding range for a state of charge in the recovery process to a lower state-of-charge range than the normal use range. Then, in the recovery process, the controller holds the state of charge of the battery in the restoration holding range in which a state of charge is relatively low. In one example, in the recovery process, the controller controls a state of charge of a battery so that it is held at the restoration holding value of 10%. In another example, in the recovery process, the controller holds a state of charge of a battery in the restoration use range from 0% to 40%.

The state of charge of the battery (battery-to-be-restored) is held in the restoration holding range in which a state of charge is relatively low, so that deviation of positive/negative-electrode electric potentials of the battery (battery-to-be-restored) from a reference state toward a high-potential side is recovered, and the positive/negative-electrode electric potentials become close to a reference state such as an initial state. Owing to such positive/negative-electrode electric potentials close to a reference state, a capacity of the battery (battery-to-be-restored) is restored.

On the other hand, in a case where a range in which a state of charge is relatively low, such as a state-of-charge range from 10% to 40%, is set as the normal use range, due to repetition of charge and discharge in the normal use range, positive/negative-electrode electric potentials of a battery deviate from a reference state (initial state) toward a low-potential side as described above. In this case, the controller sets the restoration holding range for a state of charge in the recovery process to a higher state-of-charge range than the normal use range. Then, in the recovery process, the controller holds the state of charge of the battery in the restoration holding range in which a state of charge is relatively high. In one example, in the recovery process, the controller controls a state of charge of a battery so that it is held at the restoration holding value of 90%. In another example, in the recovery process, the controller holds a state of charge of a battery in the restoration use range from 60% to 95%.

The state of charge of the battery (battery-to-be-restored) is held in the restoration holding range in which a state of charge is relatively high, so that deviation of positive/negative-electrode electric potentials of the battery (battery-to-be-restored) from a reference state toward a low-potential side is recovered, and the positive/negative-electrode electric potentials become close to a reference state such as an initial state. Owing to such positive/negative-electrode electric potentials close to a reference state, a capacity of the battery (battery-to-be-restored) is restored.

In the above-described embodiments and the like, the controller performs the recovery process of electric potential deviation from a reference state, thereby mitigating and recovering deviation of positive/negative-electrode electric potential from a reference state in the battery-to-be-restored. This appropriately restores a battery capacity that is reduced due to deviation of positive/negative-electrode electric potentials from a reference state.

Further, in the recovery process in which a state of charge of a battery is held in the restoration holding range, deviation of positive/negative-electrode electric potentials from a reference state is recovered by using a difference in a self-discharge amount between the positive electrode and the negative electrode. Thus, in the recovery process, by increasing a temperature of a battery as compared to that at times of normal use, it is possible to increase a speed of self-discharge and to promote recovery of deviation of positive/negative-electrode electric potentials.

In particular, a battery temperature in the recovery process is preferably in a range from 30° C. to 50° C. Setting a battery temperature to 30° C. or higher increases self-discharge amounts of a positive electrode and a negative electrode, which increases a speed of recovery of deviation of positive/negative-electrode electric potentials. This increases a speed of restoring a reduced capacity. Further, setting a battery temperature to 50° C. or lower suppresses un-recoverable deterioration such as deterioration of an electrode group and an electrolytic solution. In the above-described embodiments and the like, in the recovery process, a temperature of a battery-to-be-restored is regulated in a range from 30° C. to 50° C. This further promotes recovery of deviation of positive/negative-electrode electric potentials of the battery-to-be-restored from a reference state.

[Applications of Charge and Discharge Control Device]

Next, applications of the charge and discharge control device according to the above-described embodiments and the like, as well as applications of one or more batteries of which charge and discharge are controlled by the charge and discharge control device, will be described. One or more batteries are mounted in a battery pack, for example. The battery pack including one or more batteries is used as an electric power supply of an electronic device such as a digital camera, an on-vehicle electric power supply, a stationary electric power supply, or the like. In one example, an integrated circuit or the like formed in a battery pack is used as the controller of the above-described charge and discharge control device. In another example, an integrated circuit or the like formed in a device in which a battery pack is mounted, such as an electronic device or a vehicle, is used as the controller of the above-described charge and discharge control device. In this case, the controller of the charge and discharge control device is disposed outside the battery pack.

(Battery Pack)

Figure 11:
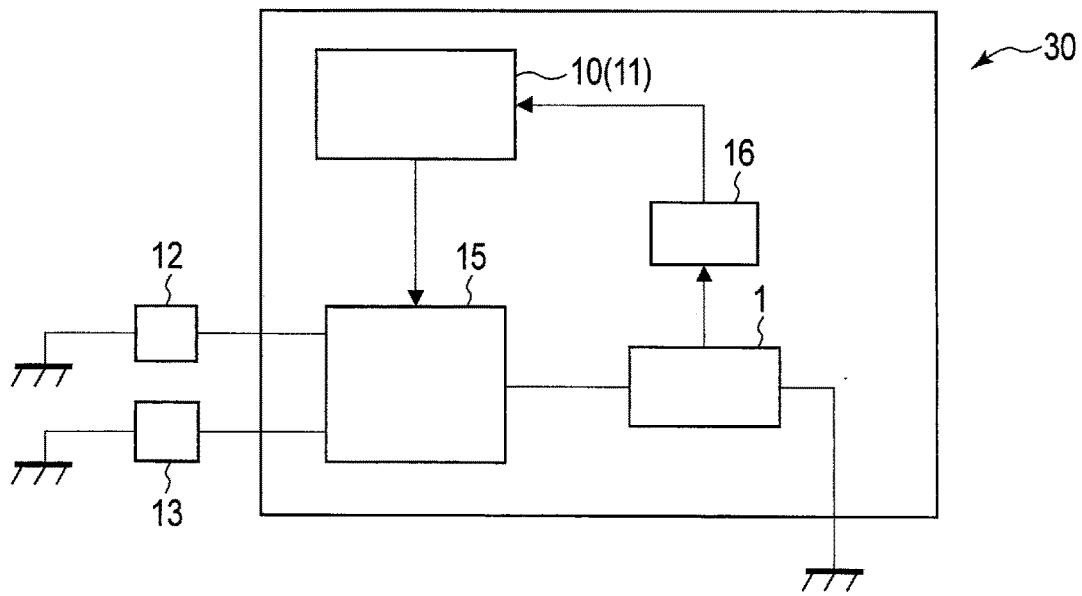
FIG. 11 is a schematic view showing an example in which the charge and discharge control device according to the embodiments is applied to a battery pack.

FIG. 11 shows one example in which the above-described charge and discharge control device is applied to a battery pack. In the example shown in FIG. 11, a battery pack 30 includes a battery 1, and the charge and discharge control device 10 including the controller 11 is mounted in the battery pack 30. In the system in the example shown in FIG. 11, the electric power supply 12 and the load 13 are provided outside the battery pack 30. Further, in the battery pack 30, the above-described driving circuit 15 and the detection circuit 16 are provided. The charge and discharge control device 10 (controller 11) controls driving of the driving circuit 15 and thus controls supply of electric power from the battery 1 to the load 13, as well as supply of electric power from the electric power supply 12 to the battery 1, thereby controlling charge and discharge of the battery 1. The detection circuit 16 detects a current flowing through the battery 1 and a voltage applied to the battery 1. The controller 11 controls charge and discharge of the battery 1 based on results of detections in the detection circuit 16.

Further, the controller 11 performs the processes related to deviation of positive/negative-electrode electric potentials of the battery 1 in the above-described manner (refer to FIG. 6). During the processes, the controller 11 performs the determination process of deviation of positive/negative-electrode electric potentials of the battery 1 from a reference state in the same manner as in any of the above-descried embodiments and the like. Then, if the deviation of positive/negative-electrode electric potentials from a reference state is beyond a prescribed range (normal range), the controller 11 performs the recovery process of the deviation of positive/negative-electrode electric potentials of the battery 1 from a reference state in the same manner as in any of the above-described embodiments and the like. In the recovery process of electric potential deviation of the battery 1, the controller 11 holds the state of charge of the battery 1 in the restoration holding range corresponding to the restoration holding value or the restoration use range, for a prescribed time.

Further, in the battery pack 30, the temperature detector and the temperature regulator (both not shown) are mounted. The temperature detector detects the temperature of the battery 1. Based on a result of detection in the temperature detector, the controller 11 controls activation of the temperature regulator, and regulates the temperature of the battery 1. In the recovery process of electric potential deviation of the battery 1, the controller 11 regulates the temperature of the battery 1 in a range from 30° C. to 50° C. Further, either inside or outside the battery pack 30, a user interface (not shown) is provided. The user interface includes an operating member on which operations are performed by an operator or the like, and further includes a notification device that notifies the operator or the like of information.

In another example, in place of the battery 1, a battery module including a plurality of batteries is mounted in the battery pack. In this case, the controller of the charge and discharge control device controls driving of the driving circuit, thereby controlling charge and discharge of each of the plurality of batteries. Then, the controller performs the determination process of deviation of positive/negative-electrode electric potentials from a reference state in the same manner as in any of the above-described embodiments and the like, for each of the plurality of batteries. If a battery-to-be-restored in which the determined deviation of positive/negative-electrode electric potentials from a reference state is beyond a prescribed range exists among the plurality of batteries, the controller performs the recovery process of the electric potential deviation on the battery-to-be-restored in the same manner as in any of the above-described embodiments and the like.

(Vehicle)

Figure 12:
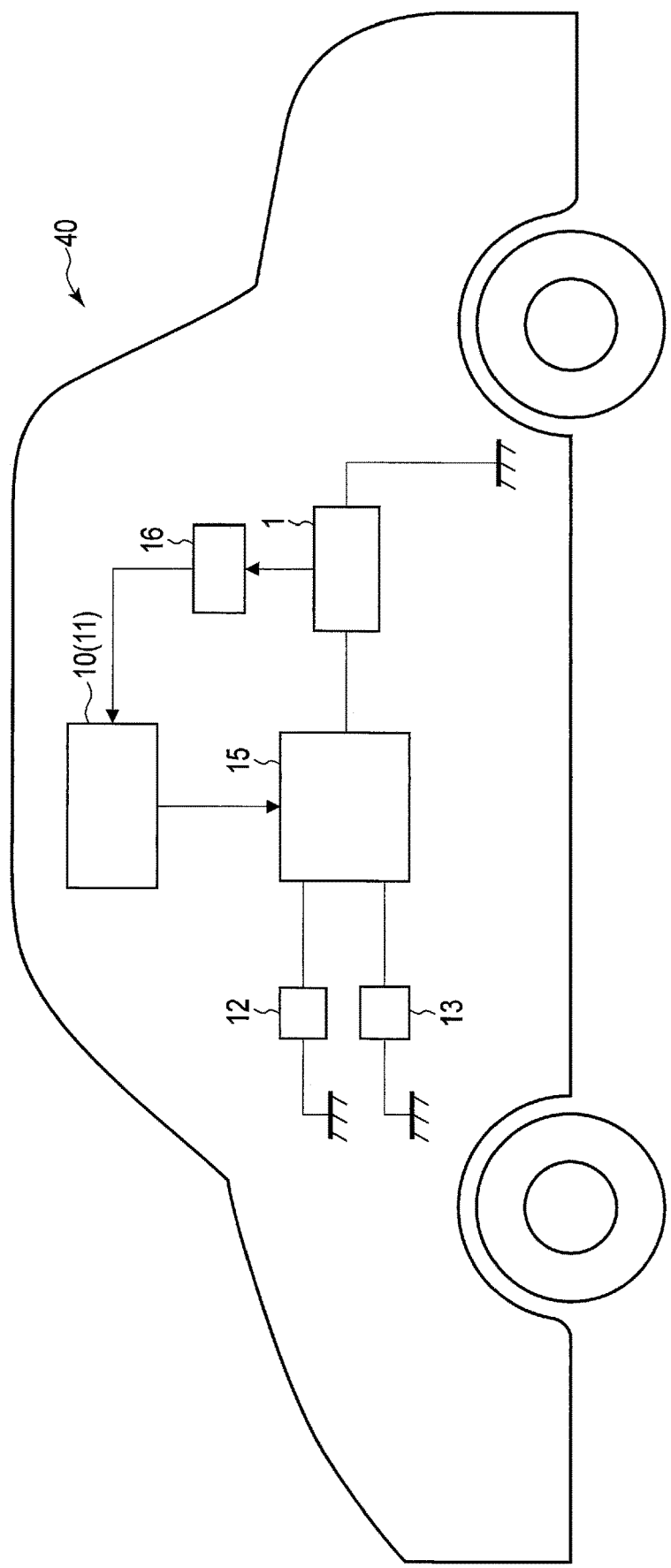
FIG. 12 is a schematic view showing an example in which the charge and discharge control device according to the embodiments is applied to a vehicle.

FIG. 12 shows an example in which the above-described charge and discharge control device is applied to a vehicle. In the example shown in FIG. 12, a vehicle 40 includes the battery 1, and the charge and discharge control device 10 including the controller 11 is mounted in the vehicle 40. The battery 1 is mounted in a battery pack, for example. Further, as the controller 11 of the charge and discharge control device 10, an integrated circuit (control circuit) or the like formed in the battery pack in which the battery 1 is mounted may be used, or an integrated circuit (control circuit) or the like formed separately from the battery pack provided in the vehicle 40 may be used.

In the vehicle 40 in the example shown in FIG. 12, the electric power supply 12 and the load 13 are mounted. Examples of the electric power supply 12 include a electric power generator mounted in the vehicle 40. Alternatively, a mechanism generating regenerative energy of motive power of the vehicle 40 may be used as the electric power supply 12. While the electric power supply 12 is mounted in the vehicle 40 in the example shown in FIG. 12, electric power may be supplied to the battery 1 from another electric power supply outside the vehicle 40. Examples of the load 13 include an electric motor mounted in the vehicle 40. Further, in the vehicle 40, the above-described driving circuit 15 and the detection circuit 16 are provided. The charge and discharge control device 10 (controller 11) controls driving of the driving circuit 15, and thus controls supply of electric power from the battery 1 to the load 13 and supply of electric power from the electric power supply 12 to the battery 1, thereby controlling charge and discharge of the battery 1. The detection circuit 16 detects a current flowing through the battery 1 and a voltage applied to the battery 1. The controller 11 controls charge and discharge of the battery 1 based on results of detections in the detection circuit 16.

Further, the controller 11 performs the processes related to deviation of positive/negative-electrode electric potentials of the battery 1 in the above-described manner (refer to FIG. 6). During the processes, the controller 11 performs the determination process of deviation of positive/negative-electrode electric potentials of the battery 1 from a reference state in the same manner as in any of the above-descried embodiments and the like. Then, if the deviation of positive/negative-electrode electric potentials from a reference state is beyond a prescribed range (normal range), the controller 11 performs the recovery process of the deviation of positive/negative-electrode electric potentials of the battery 1 from a reference state in the same manner as in any of the above-described embodiments and the like. In the recovery process of the electric potential deviation of the battery 1, the controller 11 holds the state of charge of the battery 1 in the restoration holding range corresponding to the restoration holding value or the restoration use range, for a prescribed time.

Further, in the vehicle 40, the temperature detector and the temperature regulator (both not shown) are mounted. The temperature detector detects the temperature of the battery 1. Based on a result of detection in the temperature detector, the controller 11 controls activation of the temperature regulator, and regulates the temperature of the battery 1. In the recovery process of electric potential deviation of the battery 1, the controller 11 regulates the temperature of the battery 1 in a range from 30° C. to 50° C. Further, in the vehicle 40, a user interface (not shown) is provided. The user interface includes an operating member on which operations are performed by an operator or the like, and further includes a notification device that notifies the operator or the like of information.

In another example, in place of the battery 1, a battery module including a plurality of batteries is mounted in the vehicle. In this case, the controller of the charge and discharge control device controls driving of the driving circuit, thereby controlling charge and discharge of each of the plurality of batteries. Then, the controller performs the determination process of deviation of positive/negative-electrode electric potentials from a reference state in the same manner as in any of the above-described embodiments and the like, for each of the plurality of batteries. In a case where a battery-to-be-restored in which the determined deviation of positive/negative-electrode electric potentials from a reference state is beyond a prescribed range exists among the plurality of batteries, the controller performs the recovery process of the electric potential deviation on the battery-to-be-restored in the same manner as in any of the above-described embodiments and the like.

[Verifications Regarding Embodiments and the Like]

Furthermore, verifications regarding the above-described embodiments and the like were conducted. Below, the verifications having been conducted will be described.

First Example

In a first example, a lithium-ion secondary battery was manufactured in the following manner.

In manufacture of the lithium-ion secondary battery, a positive electrode was formed in the following manner, first. For formation of a positive-electrode mixture layer (positive-electrode active material-containing layer) of the positive electrode, powders of a lithium-nickel composite oxide ($LiNi_{0.5}Co_{0.2}Mn_{0.3}O_2$), acetylene black, and polyvinylidene fluoride (PVdF) were used as a positive-electrode active material, an electro-conductive agent, and a binder, respectively. Then, those materials were compounded in proportions of 80% by weight of the positive-electrode active material, 10% by weight of the electro-conductive agent, and 10% by weight of the binder. The positive-electrode active material, the electro-conductive material, and the binder that were compounded were dispersed in a solvent of N-methylpyrrolidone (NMP), so that slurry was prepared.

Further, as a positive-electrode current collector, aluminum foil having a thickness of 15 μm was used. The prepared slurry was applied to both sides of the aluminum foil and the applied slurry was dried in a constant-temperature bath at 120° C., so that the positive-electrode mixture layer was formed. Then, pressing was performed on the positive-electrode current collector and the positive-electrode mixture layer, thereby forming the positive electrode.

Further, in manufacture of the lithium-ion secondary battery, a negative electrode was formed in the following manner. For formation of a negative-electrode mixture layer (negative-electrode active material-containing layer) of the negative electrode, powders of a niobium-titanium composite oxide ($Nb_2TiO_7$), acetylene black, and polyvinylidene fluoride (PVdF) were used as a negative-electrode active material, an electro-conductive agent, and a binder, respectively. Then, those materials were compounded in proportions of 80% by weight of the negative-electrode active material, 10% by weight of the electro-conductive agent, and 10% by weight of the binder. The negative-electrode active material, the electro-conductive material, and the binder that were compounded were dispersed in a solvent of N-methylpyrrolidone (NMP), so that slurry was prepared.

Further, as a negative-electrode current collector, aluminum foil having a thickness of 15 μm was used. The prepared slurry was applied to both sides of the aluminum foil and the applied slurry was dried in a constant-temperature bath at 120° C., so that the negative-electrode mixture layer was formed. Then, pressing was performed on the negative-electrode current collector and the negative-electrode mixture layer, thereby forming the negative electrode.

Further, as a separator, nonwoven fabric made of polyethylene with a thickness of 25 µm was used. For formation of an electrode group, a lamination having a structure in which the positive electrode, the separator, the negative electrode, and the separator were stacked in the stated order was formed. Then, the lamination was spirally wound and the wound lamination was heated and pressed at 80° C., so that the electrode group in a flat shape was formed.

Subsequently, the formed electrode group was accommodated into a package serving as a container member. As the package, a laminated film having a three-layer structure of a nylon layer, an aluminum layer, and a polyethylene layer was used. The laminated film was formed so as to have a thickness of 0.1 m. The electrode group was dried in vacuum at 80° C. for 16 hours after being accommodated into the package.

Further, as an electrolyte, a nonaqueous electrolytic solution in which 1 mol/L of $LiPF_6$ was dissolved in a solvent was used. As the solvent, a mixed solvent in which propylene carbonate (PC) and diethyl carbonate (DEC) were mixed at a volume rate of 1:2 was used. The electrolytic solution was prepared in an argon box.

The electrolytic solution was poured into the package of the laminated film where the electrode group was accommodated. After the electrolytic solution was poured, the package was completely sealed by heat sealing. This formed the lithium-ion secondary battery. Then, the formed secondary battery was charged for the first time. In this first charge, constant-current charge was performed at 0.2 C until a battery voltage (voltage between a positive electrode and a negative electrode) became equal to 3 V. After the battery voltage became equal to 3 V, constant-voltage charge at 3 V was performed, and the charge continued until a current value became equal to ½₀ C. After the first charge, the first discharge was performed. In the first discharge, constant-current discharge at 0.2 C was performed until the battery voltage (voltage between the positive electrode and the negative electrode) became equal to 1.5 V. By the first discharge, a voltage curve of the battery in a reference state corresponding to an initial state was obtained. Also by the first discharge, a discharging capacity from a fully-charged state (where a voltage was 3 V) to a completely-discharged state (where a voltage was 1.5 V) was obtained.

Additionally, the battery was so formed that a positive-electrode electric potential would become equal to a design electric potential of 4.25 V and a negative-electrode electric potential would become equal to a design electric potential of 1.25 V at a voltage of 3 V being set by the first charge. In the actual verification, a plurality of batteries each corresponding to the above-described battery were manufactured. Thereafter, one of the plurality of batteries was charged for the first time in the above-described manner, and thereafter was disassembled when its voltage became equal to 3 V. Then, the positive-electrode electric potential and the negative-electrode electric potential were measured. The results were that the positive-electrode electric potential was equal to a design potential of 4.25 V and the negative-electrode electric potential was equal to the design potential of 1.25 V.

After the first discharge, the battery was charged to a fully-charged state (where a state of charge was 100%). Then, the battery with a 100% state of charge was stored in a constant-temperature bath at 45° C. After being stored in the constant-temperature bath for one week, the battery was discharged to a completely-discharged state (where a state of charge was 0%), and a voltage curve and a discharging capacity were obtained. Then, the battery was charged again to a fully-charged state, and thereafter was stored again in the constant-temperature bath at 45° C. In the verification, the above-described processes in which the battery was discharged to a completely-discharged state, was charged again to a fully-charged state, and then was stored in the constant-temperature bath at 45° C. for one week were repeated. In the verification, the above-described processes were repeated over approximately 200 days, in which the above-described storage in the constant-temperature bath was performed 29 times.

After the 29th storage, the battery in a fully-charged state (where a voltage was 3 V) was discharged to a completely-discharged state (where a voltage was 1.5 V), and a discharging capacity and a voltage curve were obtained. The discharging capacity after the 29th storage was 90.9% of the discharging capacity in the first discharge (reference state). Further, comparison between the voltage curve in the first discharge and the voltage curve after the 29th storage revealed that in the battery after the 29th storage, the positive/negative-electrode electric potentials deviated toward a high-potential side as compared to those in the first discharge (reference state). It is noted that determination of deviation of the positive/negative-electrode electric potentials from a reference state based on the voltage curves was performed as described above in the embodiments and the like.

Further, in the verification, the above-described processes were performed on a plurality of batteries. After the 29th storage, one of the plurality of batteries was disassembled when its voltage became equal to 3 V, and its positive/negative-electrode electric potentials were measured. The results were that the positive-electrode electric potential was 4.33 V and the negative-electrode electric potential was 1.33 V. Thus, after the 29th storage, the positive/negative-electrode electric potentials deviated from the above-described design electric potentials (reference state) toward a high-potential side.

Further, in the verification, after the above-described processes were performed, the state of charge of the battery was made equal to 10%. Then, in an environment of 25° C., the battery was held with its state of charge being set to 10% for 14 days. After the battery was held for 14 days, the battery was charged to a fully-charged state. Then, the battery in a fully-charged state was discharged to a completely-discharged state, and a discharging capacity was obtained. The discharging capacity obtained after the holding for 14 days was 94.3% of the discharging capacity in the first discharge (reference state).

Further, in the verification, a plurality of batteries were held for 14 days in the above-described manner. After the holding for 14 days, one of the plurality of batteries was disassembled when its voltage became equal to 3 V, and its positive/negative-electrode electric potentials were measured. The results were that the positive-electrode electric potential was 4.26 V and the negative-electrode electric potential was 1.26 V. Thus, after the holding for days, the positive/negative-electrode electric potentials got closer to the design electric potentials (reference state) than the above-described electric potentials provided after the 29th storage.

As described above, the verification of the present example has demonstrated that in a case where positive/negative-electrode electric potentials deviate from design electric potentials (reference state) toward a high-potential side, it is possible to reduce deviation of positive/negative-electrode electric potentials from design electric potentials (reference state) by holding a battery with its state of charge being kept low for a long time. It has been further demonstrated that such reduction of deviation of the positive/negative-electrode electric potentials from the design electric potentials (reference state) restores a battery capacity that is reduced due to the deviation of the positive/negative-electrode electric potentials from the design electric potentials (reference state).

Second Example

In a second example, a lithium-ion secondary battery was manufactured in the same manner as in the first example. Further, the first charge and the first discharge were performed in the same manner as in the first example. Also in the present example, the processes in which the battery was discharged to a completely-discharged state, was charged again to a fully-charged state, and then was stored in a constant-temperature bath at 45° C. for one week were repeated in the same manner as in the first example. Also in the present example, the above-described processes were repeated over approximately 200 days and the above-described storage in the constant-temperature bath was performed 29 times in the same manner as in the first example.

Also in the present example, after the 29th storage, the battery in a fully-charged state (where a voltage was 3 V) was discharged to a completely-discharged state (where a voltage was 1.5 V), and a discharging capacity and a voltage curve were obtained. Also in the present example, the discharging capacity after the 29th storage was 90.9% of the discharging capacity in the first discharge (reference state). Further, also in the present example, comparison between the voltage curve in the first discharge and the voltage curve after the 29th storage revealed that in the battery after the 29th storage, the positive/negative-electrode electric potentials deviated toward a high-potential side as compared to those in the first discharge (reference state).

In the verification of the present example, the above-described processes were performed on a plurality of batteries. After the above-described processes were performed on each of the plurality of batteries, the state of charge of each of the plurality of batteries was made equal to 10%. Then, one of the plurality of batteries was held with its state of charge being set to 10% in an environment of 25° C. for three days. Further, another of the plurality of batteries was held with its state of charge being set to 10% in an environment of 45° C. for three days, after the above-described processes.

After the holding for three days, each of the plurality of batteries was charged to a fully-charged state. Then, each battery in a fully-charged state was discharged to a completely-discharged state, and a discharging capacity of each of the plurality of batteries was obtained. The discharging capacity of the battery that had been held in an environment of 25° C. for three days was 92.1% of the discharging capacity in the first discharge (reference state). On the other hand, the discharging capacity of the battery that had been held in an environment of 45° C. for three days was 93.1% of the discharging capacity in the first discharge (reference state). As described above, the verification of the present example has demonstrated that holding in an environment of 45° C., as compared to holding in an environment of 25° C., increases a speed of recovering of deviation of positive/negative-electrode electric potentials from a reference state, thereby increasing a speed of restoring a reduced capacity.

Third Example

In a third example, a lithium-ion secondary battery was manufactured in the same manner as in the first example. Further, the first charge and the first discharge were performed in the same manner as in the first example. In the present example, after the first discharge, the state of charge of the battery was made equal to 60%. Then, a charge-and-discharge cycling test in which charge from a 60% state of charge to a 100% state of charge (fully-charged state) and discharge from a 100% state of charge to a 60% state of charge were performed as one cycle was repeated until 1000 cycles of the tests were conducted. The charge-and-discharge cycling tests were performed in an environment of 45° C.

In the verification of the present example, voltage curves in charge and discharge in the 1000th cycle were obtained. Then, comparison between the voltage curve in the first discharge and the voltage curve in the 1000th cycle revealed that in the battery having been subjected to 1000 cycles of the above-described charge-and-discharge cycling tests, positive/negative-electrode electric potentials deviated from those in the first discharge (reference state) toward a high-potential side. It is noted that determination of deviation of the positive/negative-electrode electric potentials from a reference state based on the voltage curves was performed as described above in the embodiments and the like.

After charge and discharge in the 1000th cycle, the battery was charged to a fully-charged state. Thereafter, the battery in a fully-charged state was discharged to a completely-discharged state, and a discharging capacity of the battery was obtained. The discharging capacity of the battery that had been subjected to charge and discharge in the 1000th cycle was 85.6% of the discharging capacity in the first discharge (reference state).

Further, in the verification, the state of charge of the battery that had been subjected to 1000 cycles of the above-described charge-and-discharge cycling tests was made equal to 10%. Then, a charge-and-discharge cycling test in which charge from a 10% state of charge to a 40% state of charge and discharge from a 40% state of charge to a 10% state of charge were performed as one cycle was repeated until 50 cycles of the tests were conducted.

After charge and discharge in the 50th cycle, the battery was charged to a fully-charged state. Then, the battery in a fully-charged state was discharged to a completely-discharged state, and a discharging capacity of the battery was obtained. The discharging capacity of the battery having been subjected to charge and discharge in the 50th cycle was 87.9% of the discharging capacity in the first discharge (reference state). Thus, 50 cycles of charge-and-discharge cycling tests restored the battery capacity.

As described above, the verification of the present example has demonstrated that in a case where positive/negative-electrode electric potentials deviate from design potentials (reference state) toward a high-potential side, it is possible to restore a battery capacity that is reduced due to the deviation of positive/negative-electrode electric potentials from the design electric potentials (reference state) by using the battery in a range in which its state of charge is low.

Fourth Example

In a fourth example, a lithium-ion secondary battery was manufactured in the same manner as in the first example. Further, the first charge and the first discharge were performed in the same manner as in the first example. In the present example, after the first discharge, a charge-and-discharge cycling test in which charge from a 60% state of charge to a 100% state of charge (fully-charged state) and discharge from a 100% state of charge to a 60% state of charge were performed as one cycle were repeated until 1000 cycles of the tests were conducted, in the same manner as in the third example. Also in the present example, the charge-and-discharge cycling tests were conducted in an environment of 45° C.

In the verification of the present example, it had been revealed that due to 1000 cycles of the above-described charge-and-discharge cycling tests, positive/negative-electrode electric potentials of the battery after charge and discharge in the 1000th cycle would deviate toward a high-potential side as compared to those in the first discharge (reference state). Thus, based on a use history of the battery, it was determined that the positive/negative-electrode electric potentials of the battery deviated toward a high-potential side as compared to those in the first discharge (reference state). Also in the present example, after charge and discharge in the 1000th cycle, a discharging capacity of the battery from a fully-charged state to a completely-discharged state was obtained in the same manner as in the third example. In the present example, the discharging capacity of the battery that had been subjected to charge and discharge in the 1000th cycle was 85.8% of the discharging capacity in the first discharge (reference state).

Further, also in the present example, in the same manner as in the third example, the battery that had been subjected to 1000 cycles of the above-described charge-and-discharge cycling tests was repeatedly subjected to 50 cycles of charge-and-discharge cycling tests in each of which charge from a 10% state of charge to a 40% state of charge and discharge from a 40% state of charge to a 10% state of charge were performed as one cycle. Then, also in the present example, after charge and discharge in the 50th cycle, a discharging capacity of the battery from a fully-charged state to a completely-discharged state was obtained in the same manner as in the third example. In the present example, the discharging capacity of the battery that had been subjected to charge and discharge in the 50th cycle was 86.9% of the discharging capacity in the first discharge (reference state). Thus, also in the present example, 50 cycles of charge-and-discharge cycling tests restored the battery capacity.

As described above, also the verification of the present example has demonstrated that in a case where positive/negative-electrode electric potentials deviate from design electric potentials (reference state) toward a high-potential side, it is possible to restore a battery capacity that is reduced due to the deviation of positive/negative-electrode electric potentials from the design electric potentials (reference state) by using the battery in a range in which its state of charge is low, in the same manner as in the third example.

Fifth Example

In a fifth example, a lithium-ion secondary battery was manufactured in the same manner as in the first example. Further, the first charge and the first discharge were performed in the same manner as in the first example. In the present example, after the first discharge, the state of charge of the battery was made equal to 10%. Then, a charge-and-discharge cycling test in which charge from a 10% state of charge to a 40% state of charge and discharge from a 40% state of charge to a 10% state of charge were performed as one cycle was repeated until 1000 cycles of the tests were conducted. The charge-and-discharge cycling tests were conducted in an environment of 45° C.

In the verification of the present example, voltage curves in charge and discharge in the 1000th cycle were obtained. Then, comparison between the voltage curve in the first discharge and the voltage curve in the 1000th cycle revealed that in the battery having been subjected to 1000 cycles of the above-described charge-and-discharge cycling tests, positive/negative-electrode electric potentials deviated from those in the first discharge (reference state) toward a low-potential side. It is noted that determination of deviation of positive/negative-electrode electric potentials from a reference state based on the voltage curves was performed as described above in the embodiments and the like.

After charge and discharge in the 1000th cycle, the battery was charged to a fully-charged state. Thereafter, the battery in a fully-charged state was discharged to a completely-discharged state, and a discharging capacity of the battery was obtained. The discharging capacity of the battery that had been subjected to charge and discharge in the 1000th cycle was 95.1% of the discharging capacity in the first discharge (reference state).

Further, in the verification, the state of charge of the battery that had been subjected to 1000 cycles of the above-described charge-and-discharge cycling tests was made equal to 60%. Then, a charge-and-discharge cycling test in which charge from a 60% state of charge to a 90% state of charge and discharge from a 90% state of charge to a 60% state of charge were performed as one cycle was repeated until 50 cycles of the tests were conducted.

After charge and discharge in the 50th cycle, the battery was charged to a fully-charged state. Then, the battery in a fully-charged state was discharged to a completely-discharged state, and a discharging capacity of the battery was obtained. The discharging capacity of the battery having been subjected to charge and discharge in the 50th cycle was 97.4% of the discharging capacity in the first discharge (reference state). Thus, 50 cycles of charge-and-discharge cycling tests restored the battery capacity.

As described above, the verification of the present example has demonstrated that in a case where positive/negative-electrode electric potentials deviate from design electric potentials (reference state) toward a low-potential side, it is possible to restore a battery capacity that is reduced due to the deviation of the positive/negative-electrode electric potentials from the design electric potentials (reference state) by using the battery in a range in which its state of charge is high.

In the charge and discharge control device and the charge and discharge control method according to at least one of the above-described embodiments or examples, it is determined whether deviation of positive/negative-electrode electric potentials from a reference state is beyond a prescribed range, for each of one or more batteries. Then, in response to at least existence of a battery-to-be-restored that is a battery in which the determined deviation of positive/negative-electrode electric potentials from a reference state is beyond a prescribed range, the state of charge of the battery-to-be-restored is held in the restoration holding range for a prescribed time. Therefore, it is possible to provide the charge and discharge control device and the charge and discharge control method that properly determine reduction in a battery capacity caused due to deviation of positive/negative-electrode electric potentials from a reference state, and can appropriately restore a reduced capacity of a battery.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charge and discharge control device configured to control charge and discharge of one or more batteries, comprising a controller configured to:
   acquire information related to a positive-electrode electric potential and a negative-electrode electric potential of each of the one or more batteries;
   determine whether deviation of the positive-electrode electric potential and the negative-electrode electric potential from a reference state is beyond a prescribed range based on the acquired information, for each of the one or more batteries; and
   in response to at least existence of a battery-to-be-restored that is a battery in which the determined deviation of the positive-electrode electric potential and the negative-electrode electric potential from the reference state is beyond the prescribed range, hold a state of charge of the battery-to-be-restored in a restoration holding range for a prescribed time.

2. The charge and discharge control device according to claim 1, wherein the controller is configured to hold the state of charge of each of the one or more batteries in a normal use range different from the restoration holding range when the battery-to-be-restored does not exist.

3. The charge and discharge control device according to claim 1, wherein the controller is configured to acquire information indicating a relation between a voltage applied by one or some out of the one or more batteries and the state of charge, as the information related to the positive-electrode electric potential and the negative-electrode electric potential of each of the one or more batteries.

4. The charge and discharge control device according to claim 1, wherein the controller is configured to acquire information about a use history of each of the one or more batteries, as the information about the positive-electrode electric potential and the negative-electrode electric potential of each of the one or more batteries.

5. The charge and discharge control device according to claim 1, wherein the controller is configured to hold the state of charge of the battery-to-be-restored in the restoration holding range from 0% to 40% when the positive-electrode electric potential and the negative-electrode electric potential of the battery-to-be-restored deviate from the reference state toward a high-potential side.

6. The charge and discharge control device according to claim 1, wherein the controller is configured to hold the state of charge of the battery-to-be-restored in the restoration holding range from 60% to 95% when the positive-electrode electric potential and the negative-electrode electric potential of the battery-to-be-restored deviate from the reference state toward a low-potential side.

7. The charge and discharge control device according to claim 1, wherein the controller is configured to regulate a temperature of the battery-to-be-restored in a range from 30° C. to 50° C. while holding the state of charge of the battery-to-be-restored in the restoration holding range.

8. A battery pack comprising:
   the charge and discharge control device according to claim 1; and
   the one or more batteries of which charge and discharge are controlled by the charge and discharge control device.

9. A vehicle comprising:
   the charge and discharge control device according to claim 1; and
   the one or more batteries of which charge and discharge are controlled by the charge and discharge control device.

10. A charge and discharge control method of controlling charge and discharge of one or more batteries, comprising:
   acquiring information related to a positive-electrode electric potential and a negative-electrode electric potential for each of the one or more batteries;
   determining whether deviation of the positive-electrode electric potential and the negative-electrode electric potential from a reference state is beyond a prescribed range based on the acquired information, for each of the one or more batteries; and
   in response to at least existence of a battery-to-be-restored that is a battery in which the determined deviation of the positive-electrode electric potential and the negative-electrode electric potential from the reference state is beyond the prescribed range, holding a state of charge of the battery-to-be-restored in a restoration holding range for a prescribed time.

* * * * *